(12) United States Patent
Inano

(10) Patent No.: US 11,822,972 B2
(45) Date of Patent: Nov. 21, 2023

(54) INFORMATION PROCESSING APPARATUS AND MANAGEMENT METHOD

(71) Applicant: FUJITSU LIMITED, Kawasaki (JP)

(72) Inventor: Satoshi Inano, Minoh (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 17/748,753

(22) Filed: May 19, 2022

(65) Prior Publication Data

US 2023/0060655 A1  Mar. 2, 2023

(30) Foreign Application Priority Data

Aug. 24, 2021 (JP) .................. 2021-136306

(51) Int. Cl.
- *G06F 9/50* (2006.01)
- *H04L 41/0813* (2022.01)
- *H04L 67/1008* (2022.01)

(52) U.S. Cl.
CPC ........ *G06F 9/5094* (2013.01); *H04L 41/0813* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 9,542,217 B2* | 1/2017 | Yoshimoto | G06F 1/3268 |
| 9,568,981 B2* | 2/2017 | Kodama | G06F 1/329 |
| 9,575,548 B2* | 2/2017 | Masuno | G06F 1/329 |
| 9,759,752 B2* | 9/2017 | Doi | G06F 9/5094 |
| 10,025,369 B2* | 7/2018 | Kodama | G06F 1/3206 |
| 10,146,241 B2* | 12/2018 | Yokoyama | G06F 1/263 |
| 10,225,333 B2* | 3/2019 | Hiroshi | H04L 67/1008 |
| 10,284,658 B2* | 5/2019 | Hishida | G06F 3/067 |
| 10,466,729 B2* | 11/2019 | Yokoyama | H02J 3/32 |
| 10,887,199 B2* | 1/2021 | Onoue | H04L 67/101 |
| 2015/0153819 A1* | 6/2015 | Kodama | G06F 1/329 713/320 |
| 2016/0116932 A1* | 4/2016 | Yokoyama | G05B 15/02 700/295 |
| 2017/0019486 A1* | 1/2017 | Hishida | H04L 67/34 |
| 2017/0075612 A1* | 3/2017 | Nukariya | G06F 3/0634 |

(Continued)

FOREIGN PATENT DOCUMENTS

| | | |
|---|---|---|
| JP | 2002-236527 A | 8/2002 |
| WO | WO 2011/114427 A1 | 9/2011 |

*Primary Examiner* — Ranodhi Serrao
(74) *Attorney, Agent, or Firm* — STAAS & HALSEY LLP

(57) ABSTRACT

A non-transitory computer-readable recording medium stores a management program for causing a computer to execute a process the includes receiving designation of a first resource used by a specific server included in a plurality of servers, calculating a first estimated value of power to be consumed by the plurality of servers when the specific server executes first processing using the first resource, determining whether the first estimated value exceeds a first upper limit value of power to be consumed by the plurality of servers, setting in the specific server, when determined that the first estimated value does not exceed the first upper limit value, a second estimated value of power to be consumed by the specific server when the first processing is executed using the first resource, as a second upper limit value of power to be consumed by the specific server.

10 Claims, 30 Drawing Sheets

(56) References Cited

U.S. PATENT DOCUMENTS

| | | | | |
|---|---|---|---|---|
| 2017/0220092 A1* | 8/2017 | Kodama | ................ | G06F 1/3234 |
| 2019/0064865 A1* | 2/2019 | Yokoyama | .............. | G06F 1/263 |
| 2019/0245756 A1* | 8/2019 | Onoue | .................. | H04L 43/091 |

* cited by examiner

FIG. 8

| SERVER NAME | CPU | GPU | RESERVATION |
|---|---|---|---|
| SERVER 2a | L | 0 | NO |
| SERVER 2b | H | 4 | NO |
| SERVER 2c | L | 0 | NO |
| SERVER 2d | H | 0 | NO |
| SERVER 2e | L | 0 | NO |
| SERVER 2f | H | 8 | NO |

FIG. 9

| SERVER NAME | CPU | GPU | RESERVATION |
|---|---|---|---|
| SERVER 2a | H | 4 | NO |
| SERVER 2b | H | 4 | NO |
| SERVER 2c | L | 0 | NO |
| SERVER 2d | H | 0 | NO |
| SERVER 2e | L | 0 | NO |
| SERVER 2f | H | 8 | NO |

FIG. 10

| RESOURCE NAME | SETTING | POWER VALUE |
|---|---|---|
| CPU | L | 300 |
| CPU | H | 900 |
| GPU | 0 | 100 |
| GPU | ... | ... |
| GPU | 4 | 1300 |
| GPU | ... | ... |
| GPU | 8 | 2500 |

FIG. 11

| SERVER NAME | CAPPING POWER VALUE 133a |
|---|---|
| SERVER 2a | 2200 |
| SERVER 2b | 2200 |
| SERVER 2c | 400 |
| SERVER 2d | 1000 |
| SERVER 2e | 400 |
| SERVER 2f | 3400 |

FIG. 12

| SERVER NAME | CAPPING POWER VALUE |
|---|---|
| SERVER 2a | 2200 |
| SERVER 2b | 2200 |
| SERVER 2c | 400 |
| SERVER 2d | 1000 |
| SERVER 2e | 400 |
| SERVER 2f | 3400 |

| SERVER NAME | CPU | GPU | RESERVATION |
|---|---|---|---|
| SERVER 2a | H | 8 | NO |
| SERVER 2b | H | 4 | NO |
| SERVER 2c | L | 0 | NO |
| SERVER 2d | H | 0 | NO |
| SERVER 2e | L | 0 | NO |
| SERVER 2f | H | 8 | NO |

| SERVER NAME | CAPPING POWER VALUE |
|---|---|
| SERVER 2a | 3400 |
| SERVER 2b | 2200 |
| SERVER 2c | 400 |
| SERVER 2d | 1000 |
| SERVER 2e | 400 |
| SERVER 2f | 3400 |

| SERVER NAME | CPU | GPU | RESERVATION |
|---|---|---|---|
| SERVER 2a | H | 8 | YES |
| SERVER 2b | H | 4 | NO |
| SERVER 2c | L | 0 | NO |
| SERVER 2d | H | 0 | NO |
| SERVER 2e | L | 0 | NO |
| SERVER 2f | H | 8 | NO |

FIG. 16

| SERVER NAME | CPU | GPU | RESERVATION |
|---|---|---|---|
| SERVER 2a | H | 8 | YES |
| SERVER 2b | H | 4 | NO |
| SERVER 2c | L | 0 | NO |
| SERVER 2d | H | 0 | NO |
| SERVER 2e | L | 0 | NO |
| SERVER 2f | L | 0 | NO |

FIG. 17

| SERVER NAME | CAPPING POWER VALUE |
|---|---|
| SERVER 2a | 3400 |
| SERVER 2b | 2200 |
| SERVER 2c | 400 |
| SERVER 2d | 1000 |
| SERVER 2e | 400 |
| SERVER 2f | 400 |

| SERVER NAME | CPU | GPU | RESERVATION |
|---|---|---|---|
| SERVER 2a | H | 8 | NO |
| SERVER 2b | H | 4 | NO |
| SERVER 2c | L | 0 | NO |
| SERVER 2d | H | 0 | NO |
| SERVER 2e | L | 0 | NO |
| SERVER 2f | L | 0 | NO |

FIG. 23

| SERVER NAME | CPU | GPU | RESERVATION | TIME |
|---|---|---|---|---|
| SERVER 2a | L | 0 | NO | - |
| SERVER 2b | H | 4 | NO | 10:00 |
| SERVER 2c | L | 0 | NO | - |
| SERVER 2d | H | 0 | NO | 20:00 |
| SERVER 2e | L | 0 | NO | - |
| SERVER 2f | H | 8 | NO | 6:00 |

FIG. 24

| SERVER NAME | CPU | GPU | RESERVATION | TIME |
|---|---|---|---|---|
| SERVER 2a | L | 0 | NO | - |
| SERVER 2b | H | 4 | NO | 10:00 |
| SERVER 2c | L | 0 | NO | - |
| SERVER 2d | H | 0 | NO | 20:00 |
| SERVER 2e | L | 0 | NO | - |
| SERVER 2f | L | 0 | NO | - |

FIG. 28

| SERVER NAME | CPU | GPU | RESERVATION | TERMINAL NAME | PROGRAM NAME |
|---|---|---|---|---|---|
| SERVER 2a | L | 0 | NO | - | - |
| SERVER 2b | H | 4 | NO | U1 | P1 |
| SERVER 2c | L | 0 | NO | - | - |
| SERVER 2d | H | 0 | NO | U2 | P2 |
| SERVER 2e | L | 0 | NO | - | - |
| SERVER 2f | H | 8 | NO | U3 | P3 |

FIG. 29

| SERVER NAME | CPU | MEMORY | GPU | RESERVATION |
|---|---|---|---|---|
| SERVER 2a | 8 | 25 | 0 | NO |
| SERVER 2b | 32 | 100 | 4 | NO |
| SERVER 2c | 16 | 50 | 0 | NO |
| SERVER 2d | 64 | 200 | 0 | NO |
| SERVER 2e | 16 | 100 | 0 | NO |
| SERVER 2f | 64 | 200 | 8 | NO |

FIG. 30

| RESOURCE NAME | SETTING | POWER VALUE |
|---|---|---|
| CPU | 8 | 236 |
| CPU | 16 | 302 |
| CPU | 32 | 435 |
| CPU | 64 | 700 |
| MEMORY | 25 | 75 |
| MEMORY | 50 | 100 |
| MEMORY | 100 | 150 |
| MEMORY | 200 | 200 |
| GPU | 0 | 100 |
| GPU | ... | ... |
| GPU | 4 | 1300 |
| GPU | ... | ... |
| GPU | 8 | 2500 |

INFORMATION PROCESSING APPARATUS AND MANAGEMENT METHOD

CROSS-REFERENCE TO RELATED APPLICATION

This application is based upon and claims the benefit of priority of the prior Japanese Patent Application No. 2021-136306, filed on Aug. 24, 2021, the entire contents of which are incorporated herein by reference.

FIELD

The embodiments discussed herein are related to an information processing apparatus and a management method.

BACKGROUND

For example, in a server equipped with a high-performance central processing unit (CPU) and a high-performance graphics processing unit (GPU) (hereinafter also referred to as a high-performance server), it is desired to suppress the cost associated with the operation. For this reason, for example, in a data center in which such high-performance servers as described above are installed, in order to suppress the cost for installation of the high-performance servers (hereinafter also referred to as installation cost), it is preferable to increase the number of high-performance servers mounted in each rack as much as possible.

Upper limit power that may be supplied to the mounted high-performance servers (hereinafter also simply referred to as upper limit power) is determined in each rack. For this reason, for example, an administrator who manages the high-performance servers (hereinafter also simply referred to as an administrator) determines the number of high-performance servers to be mounted in each rack while taking into consideration a balance between power supply to each high-performance server (securing the performance of each high-performance server) and installation cost.

For example, after the operation of the high-performance servers is started, the administrator sets a limitation on supplied power based on the priority order and the power limitation range determined in advance for each high-performance server (hereinafter also referred to as power capping), in response to the fact that the power supplied to the high-performance servers by each rack exceeds the upper limit power.

International Publication Pamphlet No. WO 2011/114427 is disclosed as related art.

SUMMARY

According to an aspect of the embodiments, a non-transitory computer-readable recording medium stores a management program for causing a computer to execute a process the includes receiving designation of a first resource used by a specific server included in a plurality of servers, calculating a first estimated value of power to be consumed by the plurality of servers when the specific server executes first processing using the first resource, determining whether the first estimated value exceeds a first upper limit value of power to be consumed by the plurality of servers, setting in the specific server, when determined that the first estimated value does not exceed the first upper limit value, a second estimated value of power to be consumed by the specific server when the first processing is executed using the first resource, as a second upper limit value of power to be consumed by the specific server, and waiting, when determined that the first estimated value exceeds the first upper limit value, for the first estimated value to become equal to or smaller than the first upper limit value, without performing the setting.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating a specific example of resource information;

FIG. 9 is a diagram illustrating a specific example of the resource information;

FIG. 10 is a diagram illustrating a specific example of power conversion information;

FIG. 11 is a diagram illustrating a specific example of capping candidate information;

FIG. 12 is a diagram illustrating a specific example of capping information;

FIG. 13 is a diagram illustrating a specific example of the resource information;

FIG. 14 is a diagram illustrating a specific example of the capping candidate information;

FIG. 15 is a diagram illustrating a specific example of the resource information;

FIG. 16 is a diagram illustrating a specific example of the resource information;

FIG. 17 is a diagram illustrating a specific example of the capping candidate information;

FIG. 18 is a diagram illustrating a specific example of the resource information;

FIG. 23 is a diagram illustrating a specific example of the resource information;

FIG. 24 is a diagram illustrating a specific example of the resource information;

FIG. 28 is a diagram illustrating a specific example of the resource information;

FIG. 29 is a diagram illustrating another specific example of the resource information; and FIG. 30 is a diagram illustrating another specific example of the power conversion information.

DESCRIPTION OF EMBODIMENTS

In such high-performance servers as described above, in a case where high-load processing such as machine learning is performed, there is a large difference in power to be consumed between a time period in which processing is executed and a time period in which processing is not executed. For this reason, in this case, it is difficult for the administrator to accurately set the priority order and the power limitation range for each high-performance server. Therefore, in some cases, power capping corresponding to the processing state of the high-performance server is not performed in the high-performance server, and deterioration of processing performance occurs.

First Embodiment

A first embodiment will be described.

[Configuration of Information Processing System According to First Embodiment]

Figure 1:
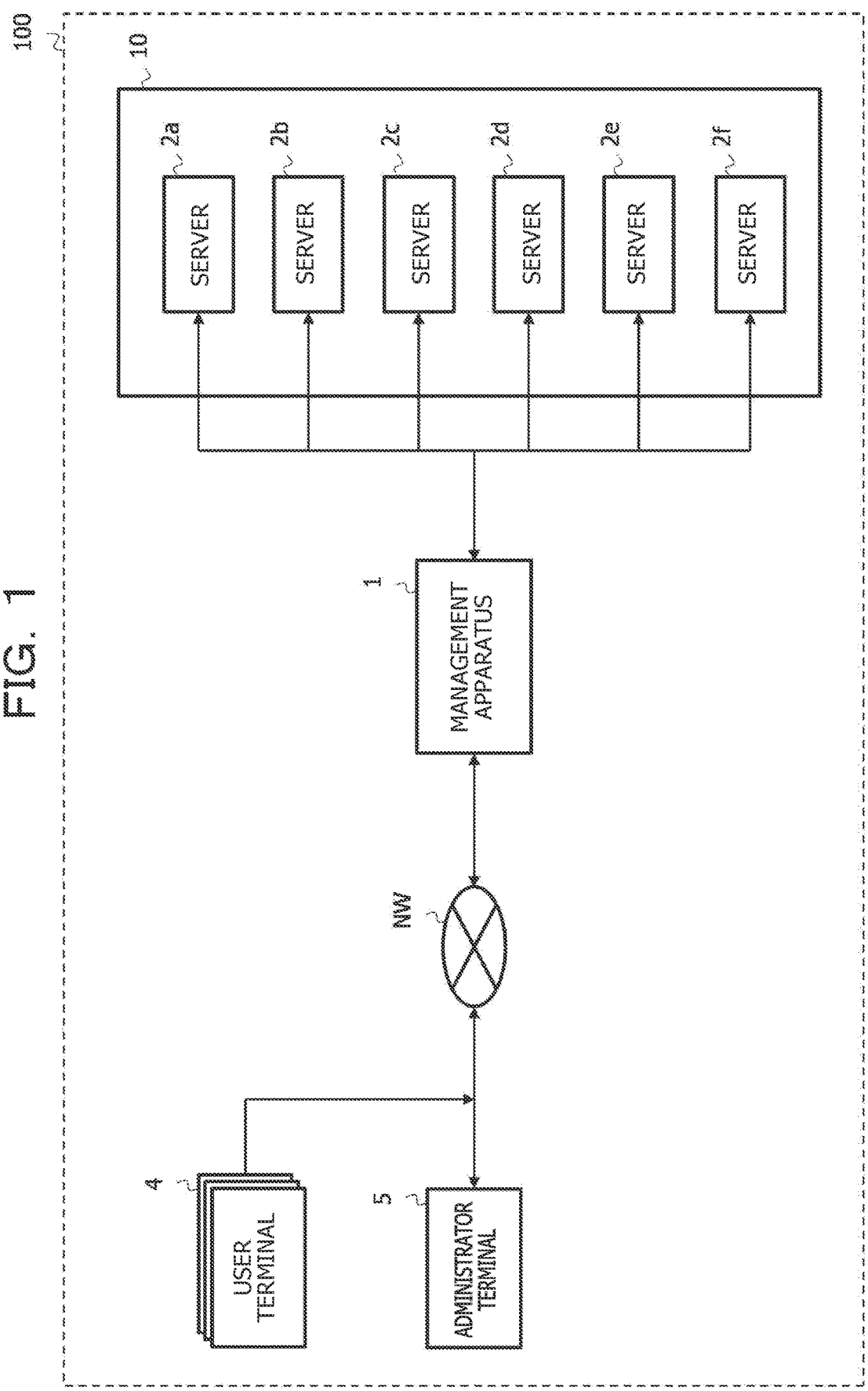
FIG. 1 is a diagram illustrating a configuration of an information processing system.
Figure 2:
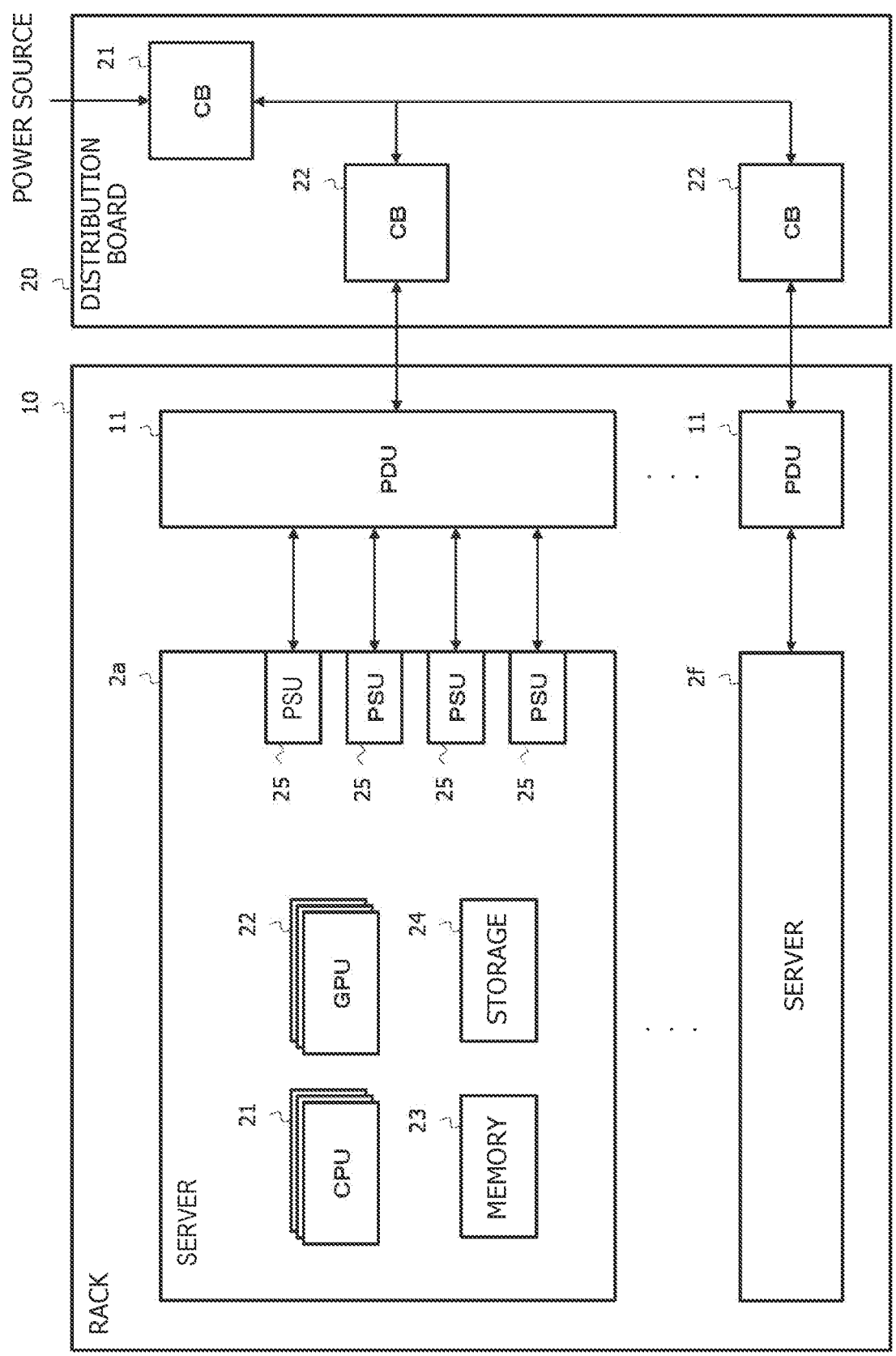
FIG. 2 is a diagram illustrating a configuration of a rack.

First, a configuration of an information processing system 100 will be described. FIG. 1 is a diagram illustrating a configuration of the information processing system 100. FIG. 2 is a diagram illustrating a configuration of a rack 10.

For example, the information processing system 100 includes a management apparatus 1, a user terminal 4, an administrator terminal 5, and the rack 10.

The rack 10 is a rack that stores one or more servers 2. For example, servers 2a, 2b, 2c, 2d, 2e, and 2f (hereinafter also collectively referred to as the servers 2) are stored in the rack 10 illustrated in FIG. 2. Although a case where six servers 2 are stored in the rack 10 will be described below, any number of servers 2 may be stored in the rack 10. Although a case where one rack 10 is included in the information processing system 100 will be described below, the information processing system 100 may include two or more racks 10.

For example, as illustrated in FIG. 2, the server 2a includes a plurality of CPUs 21, a plurality of GPUs 22, a memory 23, a storage 24, and a plurality of power supply units (PSUs) 25. For example, the server 2a operates with power supplied from a power source (not illustrated) via a circuit breaker (CB) 21 and a CB 22 arranged in a distribution board 20 and via a power distribution unit (PDU) 11 arranged in the rack 10. Since the servers 2b, 2c, 2d, 2e, and 2f have a similar configuration as the server 2a, description thereof will be omitted.

For example, the user terminal 4 is a personal computer (PC) with which a user who executes processing in the server 2 (hereinafter also simply referred to as a user) inputs desired information to the management apparatus 1 or performs other operations, and is a terminal that may access the management apparatus 1 via a network NW such as the Internet.

For example, the administrator terminal 5 is a PC with which the administrator inputs desired information to the management apparatus 1 or performs other operations, and is a terminal that may access the management apparatus 1 via the network NW such as the Internet.

For example, the management apparatus 1 performs processing of controlling power supplied from the rack 10 to each server 2 (hereinafter also referred to as power management processing).

For example, the management apparatus 1 receives designation of a resource (hereinafter also referred to as a first resource) to be used by any server 2 (hereinafter also referred to as a specific server 2) included in a plurality of servers 2 stored in the rack 10 (hereinafter also simply referred to as a plurality of servers 2). In this case, for example, the management apparatus 1 receives designation performed by the user via the user terminal 4.

When the designation of the first resource to be used by the specific server 2 is received, the management apparatus 1 calculates an estimated value for the total of power to be consumed by the plurality of servers 2 when the specific server 2 executes processing using the first resource (hereinafter also referred to as a first estimated value).

After that, for example, the management apparatus 1 determines whether the first estimated value exceeds an upper limit value for the total of power to be consumed by the plurality of servers 2 (hereinafter also referred to as a first upper limit value). For example, the first upper limit value is an upper limit value of power that may be supplied by the rack 10 to the plurality of servers 2 (the plurality of servers 2 stored in the rack 10), and is, for example, a value set in advance by the administrator.

When it is determined that the first estimated value does not exceed the first upper limit value, for example, the management apparatus 1 sets, in the specific server 2, an estimated value of power to be consumed by the specific server 2 when processing is executed using the first resource (hereinafter also referred to as a second estimated value), as an upper limit value of power to be consumed by the specific server 2 (hereinafter also referred to as a second upper limit value).

On the other hand, when it is determined that the first estimated value exceeds the first upper limit value, for example, the management apparatus 1 waits until the first estimated value is equal to or smaller than the first upper limit value, and then sets the second estimated value as the second upper limit value in the specific server 2. For example, following the end of the execution of processing in the server 2 other than the specific server 2 included in the plurality of servers 2, the management apparatus 1 waits until the first estimated value is equal to or smaller than the first upper limit value, and then sets the second estimated value as the second upper limit value in the specific server 2.

For example, the management apparatus 1 determines the resource to be used by the specific server 2 in accordance with the details of designation by the user himself/herself who causes the specific server 2 to execute the processing. For example, when it is determined that the estimated power supplied to the plurality of servers 2 (first estimated value) does not exceed the upper limit power that may be supplied to the plurality of servers 2 (first upper limit value) even in a case where the specific server 2 uses the resource designated by the user, the management apparatus 1 performs control for allowing the specific server 2 to use the resource designated by the user.

By contrast, for example, when it is determined that the estimated power supplied to the plurality of servers 2 exceeds the upper limit power that may be supplied to the plurality of servers 2 by the specific server 2 using the resource designated by the user, the management apparatus 1 waits and does not start the control for allowing the specific server 2 to use the resource designated by the user. After that, when the estimated power supplied to the plurality of servers 2 does not exceed the upper limit power that may be supplied to the plurality of servers 2 even in a case where the specific server 2 uses the resource designated by the user, the management apparatus 1 starts the control for allowing the specific server 2 to use the resource designated by the user.

Accordingly, for example, even in a case where power to be consumed by each server 2 greatly varies depending on time periods, the management apparatus 1 according to the present embodiment may perform power capping corresponding to a current processing state in each server 2 (for example, power capping that is not contrary to the user's intention). For this reason, the management apparatus 1 may suppress the occurrence of performance deterioration in each server 2. For example, even in a case where high-load processing such as machine learning is performed in each server 2, the management apparatus 1 may suppress the occurrence of performance deterioration in each server 2.

[Hardware Configuration of Information Processing System]

Figure 3:
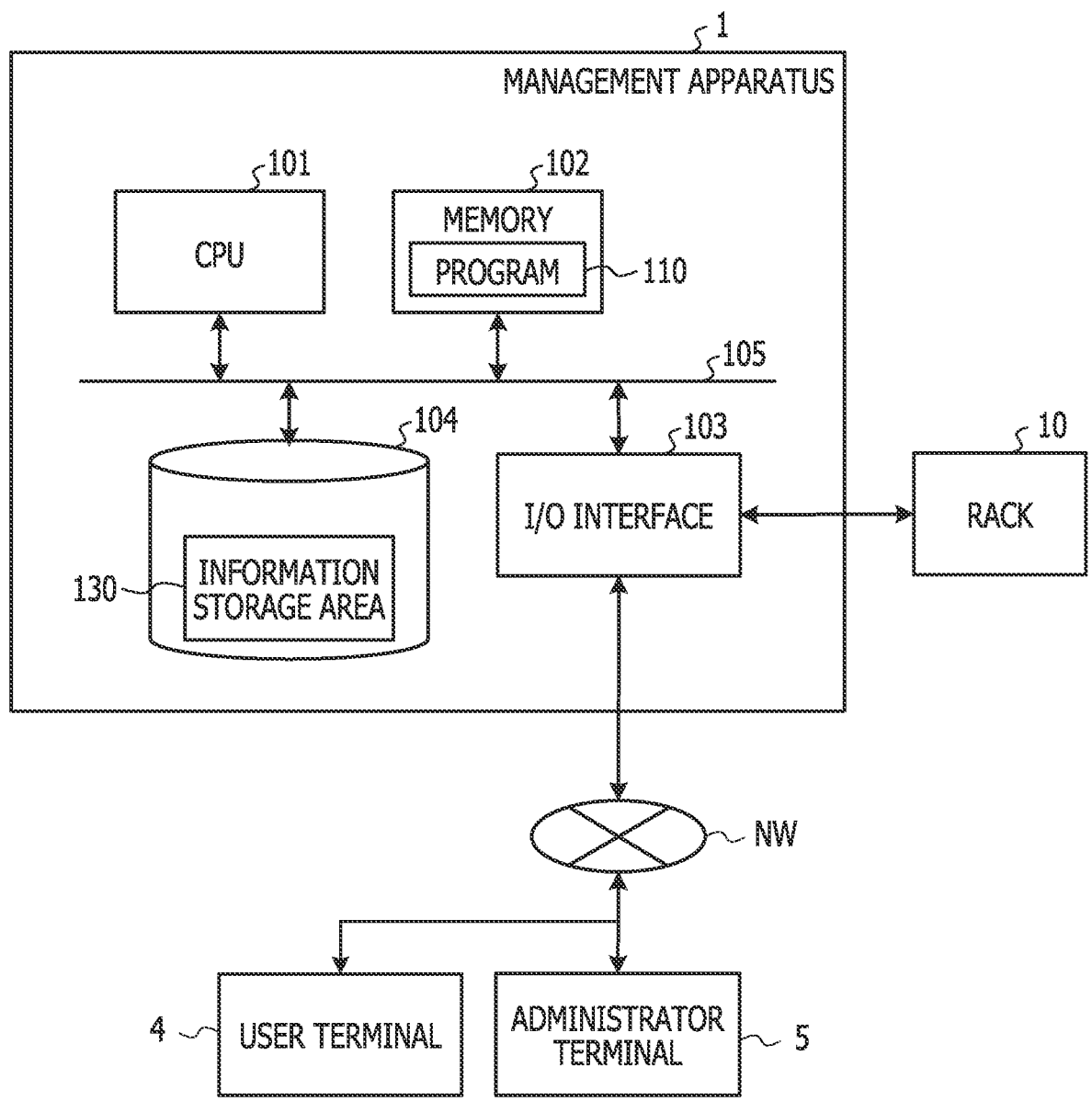
FIG. 3 is a diagram illustrating a hardware configuration of a management apparatus.

Next, a hardware configuration of the information processing system 100 will be described. FIG. 3 is a diagram illustrating a hardware configuration of the management apparatus 1.

As illustrated in FIG. 3, the management apparatus 1 is an information processing apparatus that includes a CPU 101 as a processor, a memory 102, an input/output (I/O) interface 103, and a storage medium 104. These units are coupled to each other via a bus 105.

For example, the storage medium 104 includes a program storage area (not illustrated) that stores a program 110 for performing power management processing. For example, the storage medium 104 includes an information storage area 130 that stores information to be used when power management processing is performed. For example, the storage medium 104 may be a hard disk drive (HDD) or a solid-state drive (SSD).

The CPU 101 executes the program 110 loaded from the storage medium 104 to the memory 102, and performs power management processing.

For example, the I/O interface 103 is an interface device such as a network interface card, and may access the administrator terminal 5 via the network NW such as the Internet. For example, the I/O interface 103 may access the rack 10 (each server 2 mounted in the rack 10).

[Functions of Information Processing System]

Figure 4:
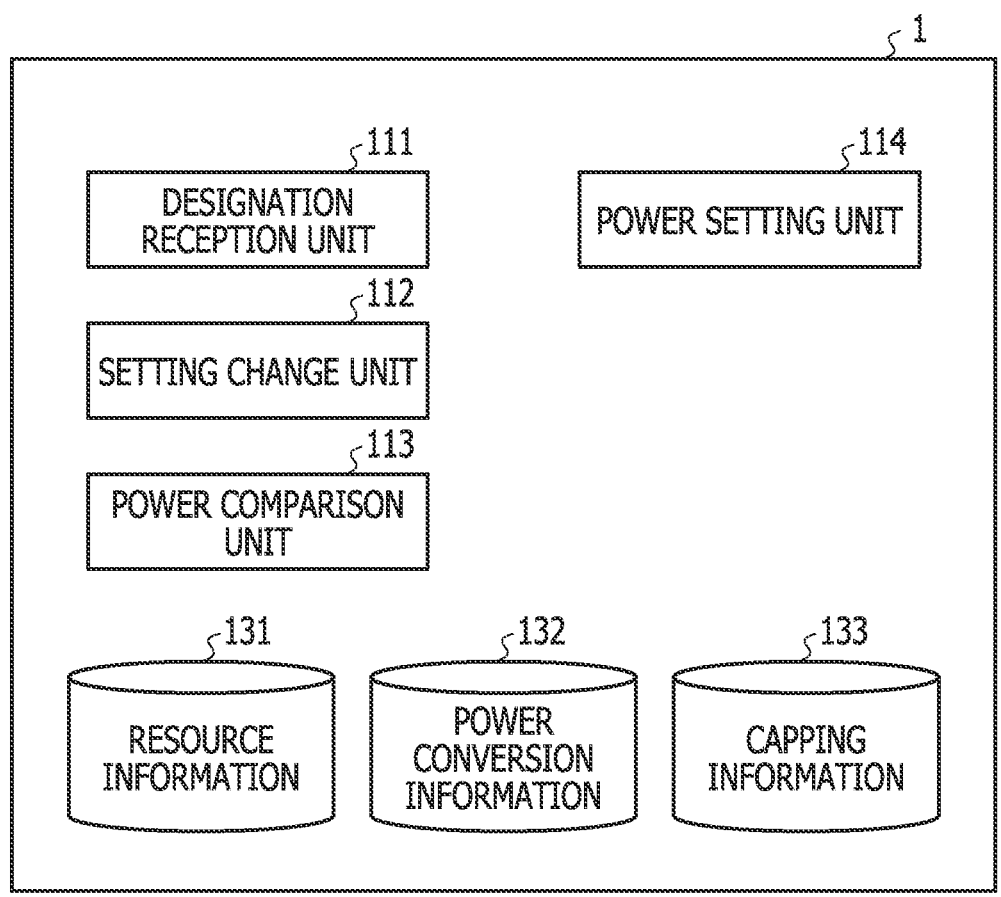
FIG. 4 is a diagram illustrating a functional configuration of the management apparatus.

Next, functions of the information processing system 100 will be described. FIG. 4 is a diagram illustrating a functional configuration of the management apparatus 1.

For example, as illustrated in FIG. 4, the management apparatus 1 implements various functions including a designation reception unit 111, a setting change unit 112, a power comparison unit 113, and a power setting unit 114, by the hardware components, such as the CPU 101 and the memory 102, and the program 110 working together organically.

For example, the management apparatus 1 stores resource information 131, power conversion information 132, and capping information 133 in the information storage area 130.

For example, the designation reception unit 111 receives designation of the first resource to be used by the specific server 2. For example, the designation reception unit 111 receives designation of the first resource performed by the user via the user terminal 4.

For example, the setting change unit 112 updates the resource information 131 stored in the information storage area 130 in accordance with the details of the designation received by the designation reception unit 111. The resource information 131 is information indicating a resource to be used by each server 2 stored in the rack 10 (hereinafter also referred to as a second resource), and is information designated in advance by the administrator. For example, the setting change unit 112 performs update of the resource information 131 such that the first resource is set as the second resource corresponding to the specific server 2.

For example, the power comparison unit 113 refers to the resource information 131 (the resource information 131 changed by the setting change unit 112) and the power conversion information 132 stored in the information storage area 130, and calculates the first estimated value for the total of power to be consumed by the plurality of servers 2 when processing is executed in accordance with the details of the resource information 131. For example, the power conversion information 132 is information indicating power to be consumed when each server 2 uses each resource.

For example, the power comparison unit 113 refers to the resource information 131 and the power conversion information 132 stored in the information storage area 130, and calculates the second estimated value of power to be consumed by each of the plurality of servers 2. For example, the power comparison unit 113 calculates the first estimated value by summing up the calculated second estimated values.

For example, the power comparison unit 113 refers to the resource information 131 and the power conversion information 132 stored in the information storage area 130, and generates the capping information 133. The capping information 133 is information indicating the second estimated value of power to be consumed by each of the plurality of servers 2. For example, the power comparison unit 113 calculates the first estimated value by summing up the second estimated values indicated by the generated capping information 133.

For example, the power comparison unit 113 may refer to the power conversion information 132 stored in the information storage area 130, and calculate the second estimated value of power to be consumed when the specific server 2 uses the first resource for which designation is received by the designation reception unit 111. For example, the power comparison unit 113 may refer to the resource information 131 stored in the information storage area 130, and identify, for each server 2 other than the specific server 2 among the plurality of servers 2, the second resource corresponding to each server 2. For example, the power comparison unit 113 may refer to the power conversion information 132 stored in the information storage area 130, and calculate, for each server 2 other than the specific server 2 among the plurality of servers 2, the second estimated value of power to be consumed when each server 2 uses the second resource corresponding to each server 2. For example, the power comparison unit 113 may calculate the first estimated value by summing up the second estimated values calculated for the plurality of servers 2.

After that, for example, the power comparison unit 113 determines whether the calculated first estimated value exceeds the first upper limit value for the total of power to be consumed by the plurality of servers 2.

For example, in a case where the power comparison unit 113 determines that the first estimated value does not exceed the first upper limit value, the power setting unit 114 sets, in the specific server 2, the second estimated value of power to be consumed by the specific server 2 when the first resource is used, as the second upper limit value of power to be consumed by the specific server 2.

For example, the power setting unit 114 identifies the second estimated value of power to be consumed by the specific server 2 among the estimated values of power included in the capping information 133 generated by the power comparison unit 113. For example, the power setting unit 114 performs processing of setting the identified second estimated value as the second upper limit value in the specific server 2 (hereinafter also referred to as setting processing).

In this case, the power setting unit 114 may send an instruction to set the second estimated value as the second upper limit value to the specific server 2. The baseboard management controller (BMC) of the specific server 2 may control the operating frequencies of the CPU and the GPU such that power to be consumed by the specific server 2 does not exceed the second upper limit value (second estimated value), in accordance with the instruction from the management apparatus 1 (the power setting unit 114).

For example, in a case where the power comparison unit 113 determines that the first estimated value exceeds the first upper limit value, the power setting unit 114 waits until the first estimated value is equal to or smaller than the first upper limit value, and then sets the second estimated value as the second upper limit value in the specific server 2.

For example, following the end of the execution of processing in the server 2 other than the specific server 2 included in the plurality of servers 2, the power setting unit 114 waits until the first estimated value calculated from the capping information 133 generated again by the power comparison unit 113 is equal to or smaller than the first upper limit value, and then performs the setting processing of setting the second estimated value as the second upper limit value in the specific server 2.

[Overview of First Embodiment]

Figure 5:
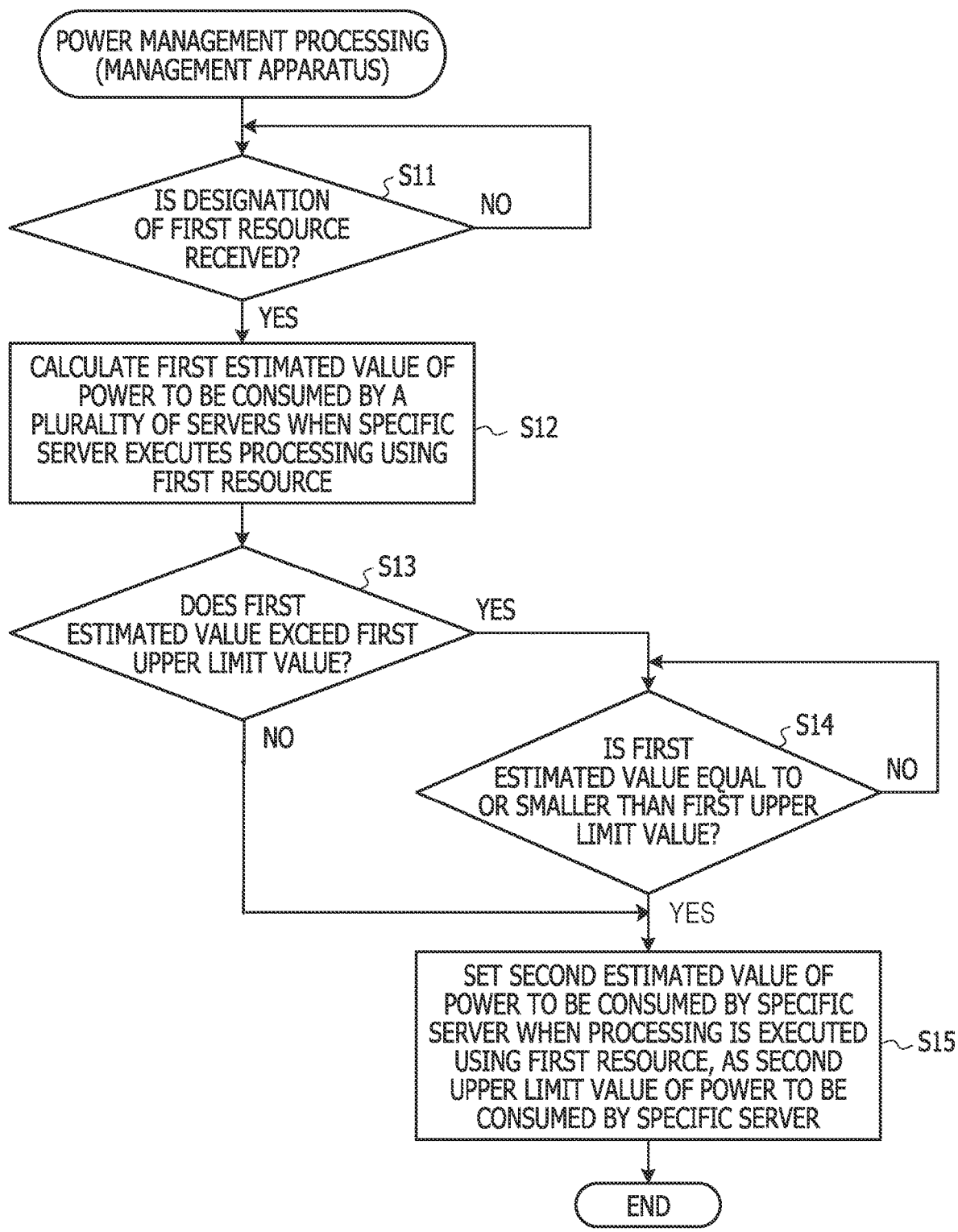
FIG. 5 is a flowchart illustrating an overview of power management processing according to a first embodiment.

Next, an overview of the first embodiment will be described. FIG. 5 is a flowchart illustrating an overview of power management processing according to the first embodiment.

For example, as illustrated in FIG. 5, the management apparatus 1 waits until designation of the first resource to be used by the specific server 2 included in the plurality of servers 2 stored in the rack 10 is newly received (NO in S11).

When the designation of the first resource is newly received (YES in S11), the management apparatus 1 calculates the first estimated value for the total of power to be consumed by the plurality of servers 2 when the specific server 2 executes processing using the first resource (S12).

After that, the management apparatus 1 determines whether the first estimated value exceeds the first upper limit value for the total of power to be consumed by the plurality of servers 2 (S13).

When it is determined that the first estimated value does not exceed the first upper limit value (NO in S13), for example, the management apparatus 1 sets, in the specific server 2, the second estimated value of power to be consumed by the specific server 2 when processing is executed using the first resource, as the second upper limit value of power to be consumed by the specific server 2 (S15).

On the other hand, when it is determined that the first estimated value exceeds the first upper limit value (YES in S13), the management apparatus 1 waits until the first estimated value is equal to or smaller than the first upper limit value (NO in S14). For example, following the end of the execution of processing in the server 2 other than the specific server 2 included in the plurality of servers 2, the management apparatus 1 waits until the first estimated value is equal to or smaller than the first upper limit value.

When the first estimated value is equal to or smaller than the first upper limit value (YES in S14), for example, the management apparatus 1 performs the processing of S15.

For example, the management apparatus 1 according to the present embodiment determines the resource to be used by the specific server 2 in accordance with the details of designation by the user himself/herself who causes the specific server 2 to execute the processing (details of designation in the processing of S11).

Accordingly, for example, even in a case where power to be consumed by each server 2 greatly varies depending on time periods, the management apparatus 1 according to the present embodiment may perform power capping corresponding to a current processing state in each server 2 (for example, power capping that is not contrary to the user's intention). For this reason, the management apparatus 1 may suppress the occurrence of performance deterioration in each server 2. For example, even in a case where high-load processing such as machine learning is performed in each server 2, the management apparatus 1 may suppress the occurrence of performance deterioration in each server 2.

[Details of First Embodiment]

Figure 6:
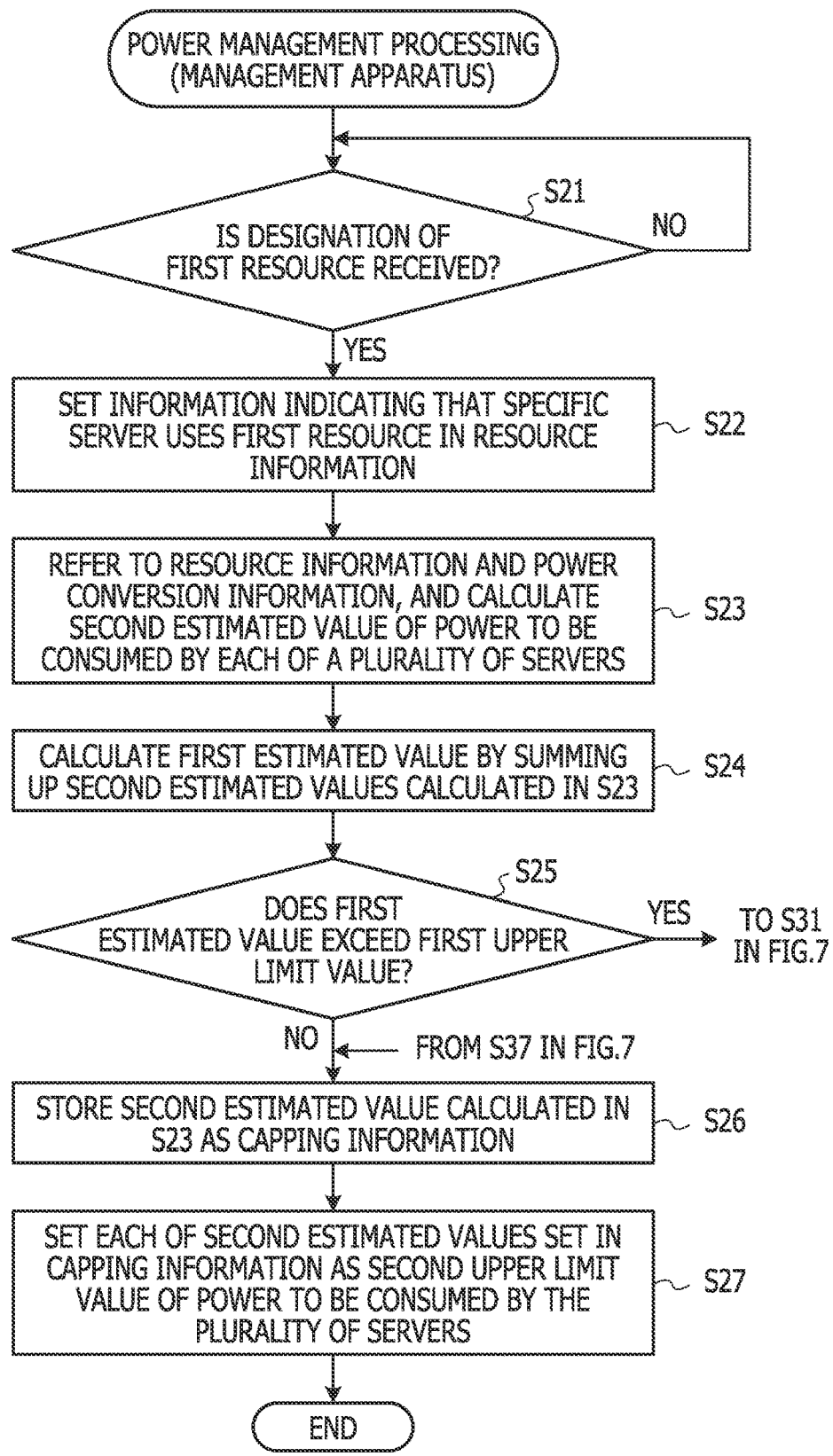
FIG. 6 is a flowchart illustrating details of the power management processing according to the first embodiment.
Figure 7:
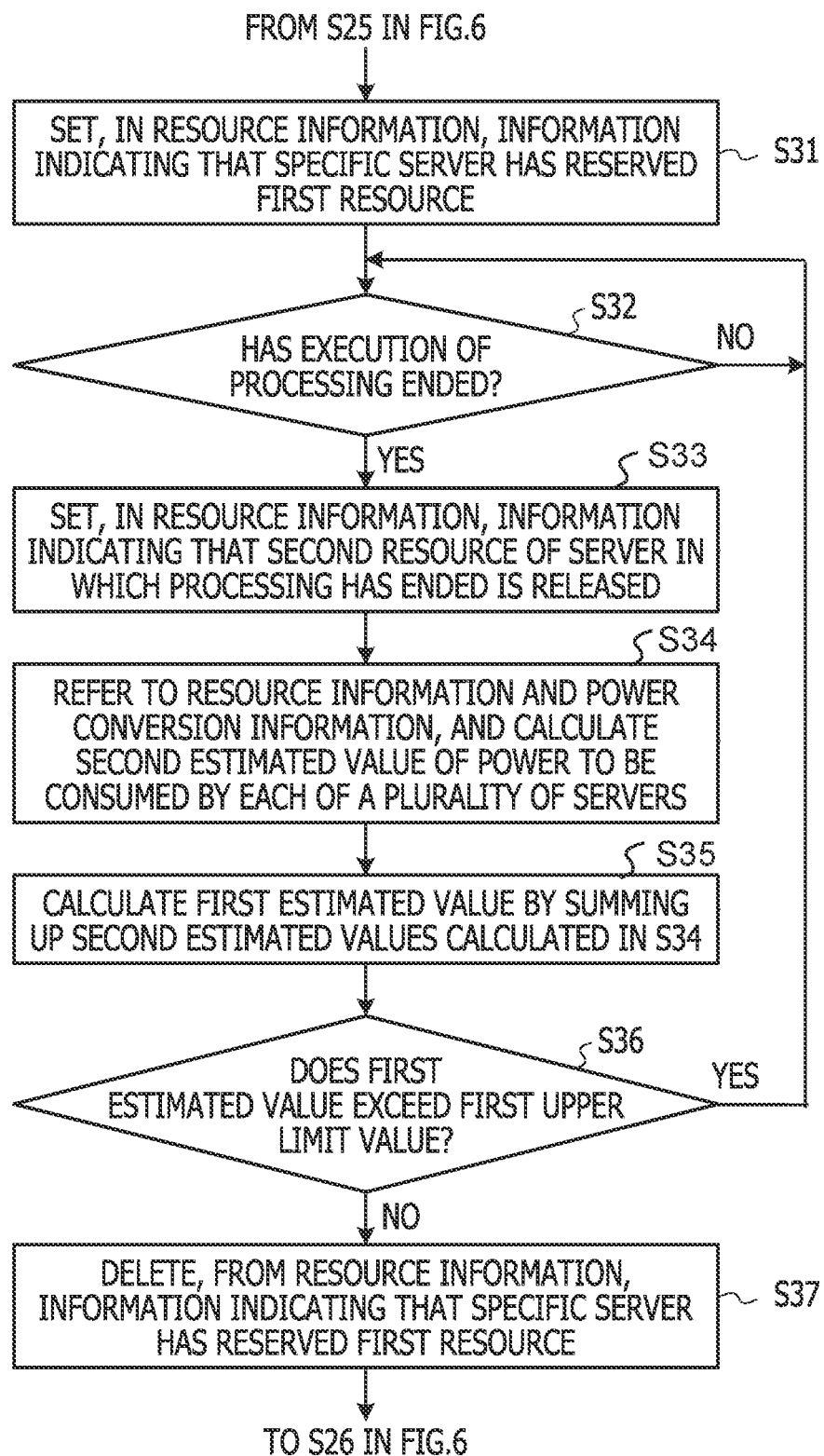
FIG. 7 is a flowchart illustrating details of the power management processing according to the first embodiment.

Next, details of the first embodiment will be described. FIGS. 6 and 7 are flowcharts illustrating details of the power management processing according to the first embodiment. FIGS. 8 to 20 are diagrams illustrating details of the power management processing according to the first embodiment.

For example, as illustrated in FIG. 6, the designation reception unit 111 waits until designation of the first resource to be used by the specific server 2 is received (NO in S21).

When the designation of the first resource is received (YES in S21), for example, the setting change unit 112 sets the details corresponding to the designation received in the processing of S21 in the resource information 131 (S22). For example, the setting change unit 112 updates the information corresponding to the specific server 2 in the resource information 131 stored in the information storage area 130 in accordance with the details corresponding to the designation received in the processing of S21. Hereinafter, specific examples of the resource information 131 will be described.

Specific Examples of Resource Information

FIGS. 8, 9, 13, 15, 16, and 18 are diagrams illustrating specific examples of the resource information 131.

The resource information 131 illustrated in FIG. 8 and the like includes, as items, "server name" indicating the name of each server 2, "CPU" indicating the degree of the number of cores of the CPU 21 used by each server 2, and "GPU" indicating the number of GPUs 22 used by each server 2. "H (high)" indicating that the number of cores of the CPU 21 used by each server 2 is large or "L (low)" indicating that the number of cores of the CPU 21 used by each server 2 is small, is set for "CPU". The resource information 131 illustrated in FIG. 8 and the like includes, as an item, "reservation" indicating whether a resource to be used by each server 2 is in a state of being reserved (hereinafter also referred to as a reserved state). "yes" indicating that a resource to be used by each server 2 is in a reserved state or "no" indicating that a resource to be used by each server 2 is not in a reserved state, is set for "reservation". Reservation of a resource to be used by each server 2 will be described later.

For example, in the resource information 131 illustrated in FIG. 8, as the information in the first row, "server 2*a*" is set for "server name", "L" is set for "CPU", "0" is set for "GPU", and "no" is set for "reservation".

For example, in the resource information 131 illustrated in FIG. 8, as the information in the second row, "server 2*b*" is set for "server name", "H" is set for "CPU", "4" is set for "GPU", and "no" is set for "reservation".

For example, the resource information 131 illustrated in FIG. 8 indicates that more resources are used for the processing executed in the server 2*b* than for the processing executed in the server 2*a*. For example, the resource information 131 illustrated in FIG. 8 indicates that the user has made settings such that the number of resources to be used by the server 2*b* is larger than the number of resources to be used by the server 2*a*. Description for the remaining information included in FIG. 8 is omitted.

For example, in a case where designation of setting "H" for the CPU 21 of the server 2*a* and setting "4" for the GPU 22 of the server 2*a* is received in the processing of S11, as indicated by the underlined portions in FIG. 9, the setting change unit 112 changes the information of "CPU" and "GPU" for the server 2*a* (information in the first row) among the information included in the resource information 131 to "H" and "4", respectively.

Returning to FIG. 6, for example, the power comparison unit 113 refers to the resource information 131 (the resource information 131 the contents of which have been changed in the processing of S22) and the power conversion information 132 stored in the information storage area 130, and calculates the second estimated value of power to be consumed by each of the plurality of servers 2 (S23). Hereinafter, a specific example of the power conversion information 132 will be described.

Specific Example of Power Conversion Information

FIG. 10 is a diagram illustrating a specific example of the power conversion information 132.

The power conversion information 132 illustrated in FIG. 10 includes, as items, "resource name" indicating the name of each resource, "setting" indicating the setting corresponding to each resource, and "power value" indicating the power to be consumed when each resource is used.

For example, in the power conversion information 132 illustrated in FIG. 10, as the information in the first row, "CPU" is set for "resource name", "L" is set for "setting", and "300 (W)" is set for "power value".

For example, in the power conversion information 132 illustrated in FIG. 10, as the information in the second row, "CPU" is set for "resource name", "H" is set for "setting", and "900 (W)" is set for "power value".

For example, in the power conversion information 132 illustrated in FIG. 10, as the information in the fifth row, "GPU" is set for "resource name", "4" is set for "setting", and "1300 (W)" is set for "power value". Description for the remaining information included in FIG. 10 is omitted.

In the resource information 131 described with reference to FIG. 9, as the information in the first row, "server 2*a*" is set for "server name", "H" is set for "CPU", and "4" is set for "GPU". For this reason, for example, in the processing of S23, the power comparison unit 113 identifies power consumed by the server 2*a* using the CPU 21 as "900 (W)", and identifies power consumed by the server 2*a* using the GPU 22 as "1300 (W)". In this case, the power comparison unit 113 calculates the second estimated value corresponding to the server 2*a* as "2200 (W)", which is the sum of "900 (W)" and "1300 (W)".

For example, the power comparison unit 113 may generate information including each of the second estimated values calculated in the processing of S23 as candidate information that may be used as the capping information 133 (hereinafter also referred to as capping candidate information 133*a*). Hereinafter, the capping candidate information 133*a* will be described.

Specific Examples of Capping Candidate Information

FIGS. 11, 14, and 17 are diagrams illustrating specific examples of the capping candidate information 133*a*.

The capping candidate information 133*a* illustrated in FIG. 11 and the like includes, as items, "server name" indicating the name of each server 2 and "capping power value" indicating the second estimated value corresponding to each server 2.

For example, in the capping candidate information 133*a* illustrated in FIG. 11, as the information in the first row, "server 2*a*" is set for "server name" and "2200 (W)" is set for "capping power value".

For example, in the capping candidate information 133*a* illustrated in FIG. 11, as the information in the second row, "server 2*b*" is set for "server name" and "2200 (W)" is set for "capping power value". Description for the remaining information included in FIG. 11 is omitted.

Returning to FIG. 6, for example, the power comparison unit 113 calculates the first estimated value by summing up the second estimated values calculated in the processing of S23 (S24).

For example, in the capping candidate information 133*a* illustrated in FIG. 11, "2200 (W)", "2200 (W)", "400 (W)", "1000 (W)", "400 (W)", and "3400 (W)" are set for "capping power value". For this reason, for example, in the processing of S24, the power comparison unit 113 calculates the first estimated value as "9600 (W)", which is the sum of "2200 (W)", "2200 (W)", "400 (W)", "1000 (W)", "400 (W)", and "3400 (W)".

Returning to FIG. 6, for example, the power comparison unit 113 determines whether the first estimated value calculated in the processing of S24 exceeds the first upper limit value (S25).

For example, in a case where the first upper limit value is "10000 (W)" and the first estimated value is "9600 (W)", the power comparison unit 113 determines that the first estimated value does not exceed the first upper limit value.

When it is determined that the first estimated value calculated in the processing of S24 does not exceed the first upper limit value (NO in S25), for example, the power setting unit 114 stores, in the information storage area 130, the second estimated value calculated in the processing of S23 as the capping information 133 (S26). For example, the power setting unit 114 stores, in the information storage area 130, the capping candidate information 133a generated by the power comparison unit 113 as the capping information 133. Hereinafter, a specific example of the capping information 133 will be described.

Specific Example of Capping Information

FIG. 12 is a diagram illustrating a specific example of the capping information 133.

The capping information 133 illustrated in FIG. 12 includes the same items as those of the capping candidate information 133a described with reference to FIG. 11.

For example, in the capping information 133 illustrated in FIG. 12, similarly to the capping candidate information 133a described with reference to FIG. 11, as the information in the first row, "server 2a" is set for "server name" and "2200 (W)" is set for "capping power value".

For example, in the capping information 133 illustrated in FIG. 12, similarly to the capping candidate information 133a described with reference to FIG. 11, as the information in the second row, "server 2b" is set for "server name" and "2200 (W)" is set for "capping power value". Description for the remaining information included in FIG. 12 is omitted.

Returning to FIG. 6, for example, the power setting unit 114 sets, in each of the plurality of servers 2, each of the second estimated values set in the capping information 133 stored in the information storage area 130, as the second upper limit value of power to be consumed by the relevant server 2 (S27).

For example, in the rack 10, power is supplied to each of the plurality of servers 2 in accordance with the capping information 133 generated based on the details of designation by the user.

Accordingly, for example, the management apparatus 1 may suppress power capping performed at timing not intended by the user.

On the other hand, when it is determined in the processing of S25 that the first estimated value calculated in the processing of S24 exceeds the first upper limit value (YES in S25), for example, as illustrated in FIG. 7, the setting change unit 112 sets, in the resource information 131, information indicating that the specific server 2 has reserved the first resource (S31).

For example, in a case where the first estimated value calculated in the processing of S24 exceeds the first upper limit value, the management apparatus 1 determines that the specific server 2 may not use the first resource due to the restriction on the power supply capacity of the rack 10. In this case, the management apparatus 1 sets, in the resource information 131, information indicating that the first resource to be used by the specific server 2 is in a reserved state in order to cause the rack to wait and not supply (to the specific server 2) power to be consumed when the specific server 2 uses the first resource. Hereinafter, a specific example of the processing of S31 will be described.

Specific Example of Processing of S31

FIGS. 13 to 15 are diagrams illustrating a specific example of the processing of S31.

For example, in a case where "H" is set for "CPU" and "8" is set for "GPU" as the information corresponding to "server 2a" (information in the first row) in the resource information 131 as illustrated in FIG. 13, in the processing of S23, the power comparison unit 113 sets "3400 (W)" for "capping power value" as the information corresponding to "server 2a" (information in the first row) in the capping candidate information 133a as illustrated in FIG. 14. In this case, in the processing of S24, the power comparison unit 113 calculates the first estimated value as "10800 (W)".

For example, in a case where the first upper limit value is "10000 (W)", "10800 (W)" calculated as the first estimated value exceeds the first upper limit value. For this reason, in this case, as indicated by the underlined portion in FIG. 15, the setting change unit 112 sets "yes" for "reservation" as the information corresponding to "server 2a" (information in the first row).

Returning to FIG. 7, for example, the setting change unit 112 waits until the processing executed in the server 2 other than the specific server 2 among the plurality of servers 2 ends (NO in S32).

When the processing executed in the server 2 other than the specific server 2 among the plurality of servers 2 has ended (YES in S32), for example, the setting change unit 112 sets, in the resource information 131, information indicating that the resource of the server 2 in which the processing determined to have ended in the processing of S32 is released (S33).

For example, in a case where the processing executed by the server 2f ends, as indicated by the underlined portions in FIG. 16, the setting change unit 112 sets "L" for "CPU" and "0" for "GPU" as the information corresponding to "server 2f" (information in the sixth row).

Subsequently, for example, the power comparison unit 113 refers to the resource information 131 (the resource information 131 the contents of which have been changed in the processing of S33) and the power conversion information 132 stored in the information storage area 130, and calculates the second estimated value of power to be consumed by each of the plurality of servers 2 (S34).

In this case, for example, as indicated by the underlined portion in FIG. 17, the power comparison unit 113 updates the information set for "capping power value" as the information corresponding to "server 2f" (information in the sixth row).

After that, for example, the power comparison unit 113 calculates the first estimated value by summing up the second estimated values calculated in the processing of S34 (S35).

For example, the power comparison unit 113 determines whether the first estimated value calculated in the processing of S35 exceeds the first upper limit value (S36).

When it is determined that the first estimated value calculated in the processing of S35 exceeds the first upper limit value (YES in S36), for example, the setting change unit 112 performs the processing of S32 and subsequent processing again.

On the other hand, when it is determined that the first estimated value calculated in the processing of S35 does not exceed the first upper limit value (NO in S36), for example, the setting change unit 112 deletes, from the resource information 131, information indicating that the specific server 2 has reserved the first resource (S37). After that, the power setting unit 114 performs the processing of S26 in FIG. 6 and subsequent processing.

In this case, for example, the setting change unit 112 determines that the specific server 2 may now use the first resource due to the change in the state of power supply by the rack 10, and deletes, from the resource information 131, information indicating that the specific server 2 has reserved the first resource.

For example, as indicated by the underlined portion in FIG. 18, the setting change unit 112 sets "no" for "reservation" as the information corresponding to "server 2a" (information in the first row).

As described above, for example, the management apparatus 1 according to the present embodiment newly receives designation of the first resource to be used by the specific server 2 included in the plurality of servers 2 stored in the rack 10. When the designation of the first resource to be used by the specific server 2 is newly received, the management apparatus 1 calculates the first estimated value for the total of power to be consumed by the plurality of servers 2 when the specific server 2 executes processing using the first resource.

After that, for example, the management apparatus 1 determines whether the first estimated value exceeds the first upper limit value for the total of power to be consumed by the plurality of servers 2.

When it is determined that the first estimated value does not exceed the first upper limit value, for example, the management apparatus 1 sets, in the specific server 2, the second estimated value of power to be consumed by the specific server 2 when processing is executed using the first resource, as the second upper limit value of power to be consumed by the specific server 2.

Figure 19:
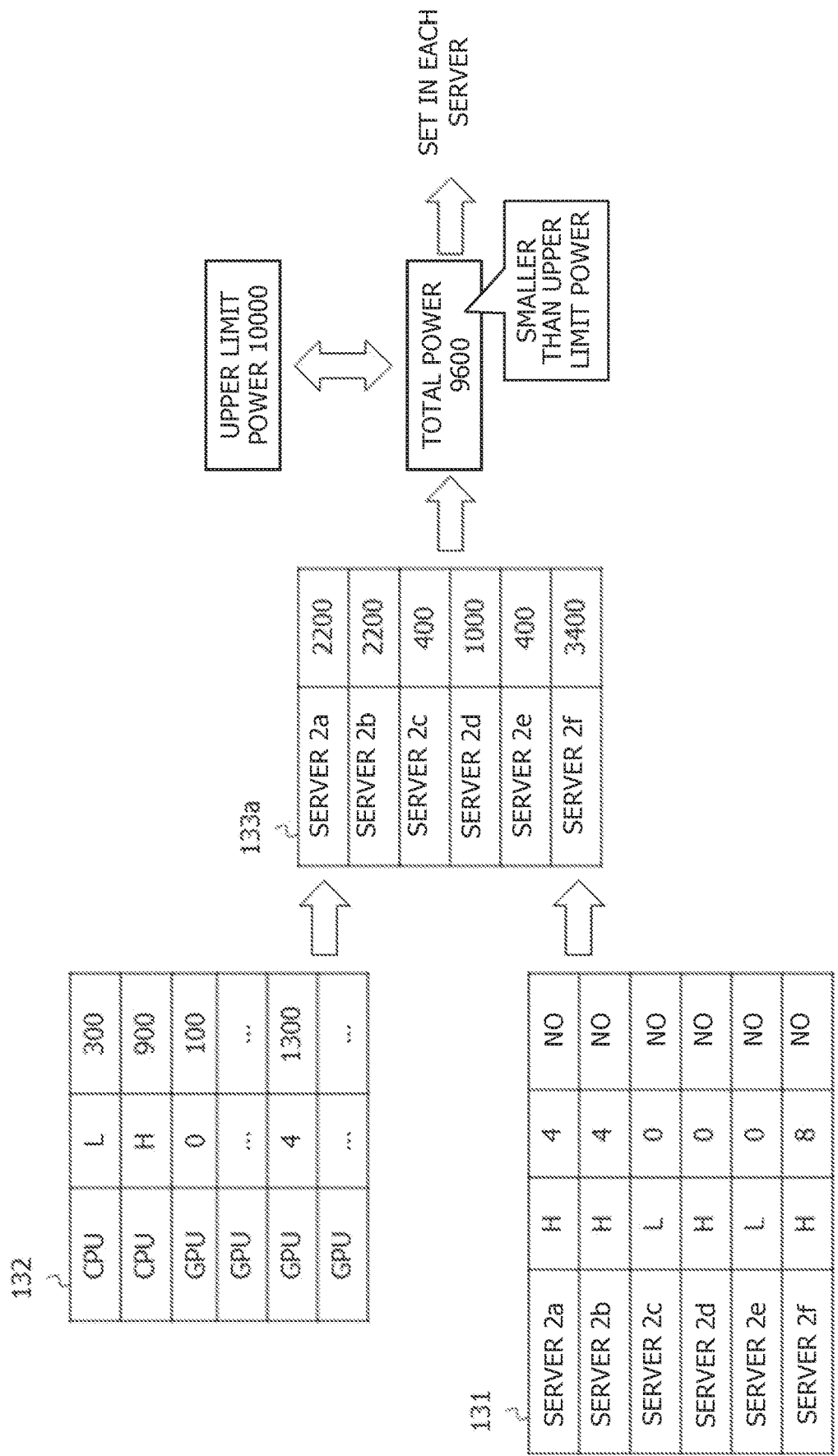
FIG. 19 is a diagram illustrating details of the power management processing according to the first embodiment.

For example, as illustrated in FIG. 19, in a case where the total of power to be consumed by the plurality of servers 2 (first estimated value) is equal to or smaller than the predetermined upper limit value (first upper limit value), the management apparatus 1 sets, in the specific server 2, the value included in the capping candidate information 133a generated from the resource information 131 and the power conversion information 132 (second estimated value), as the upper limit value of power to be consumed by the specific server 2 (second upper limit value).

On the other hand, when it is determined that the first estimated value exceeds the first upper limit value, for example, the management apparatus 1 waits until the first estimated value is equal to or smaller than the first upper limit value, and then sets the second estimated value as the second upper limit value in the specific server 2. For example, following the end of the execution of processing in the server 2 other than the specific server 2 included in the plurality of servers 2, the management apparatus 1 waits until the first estimated value is equal to or smaller than the first upper limit value.

Figure 20:
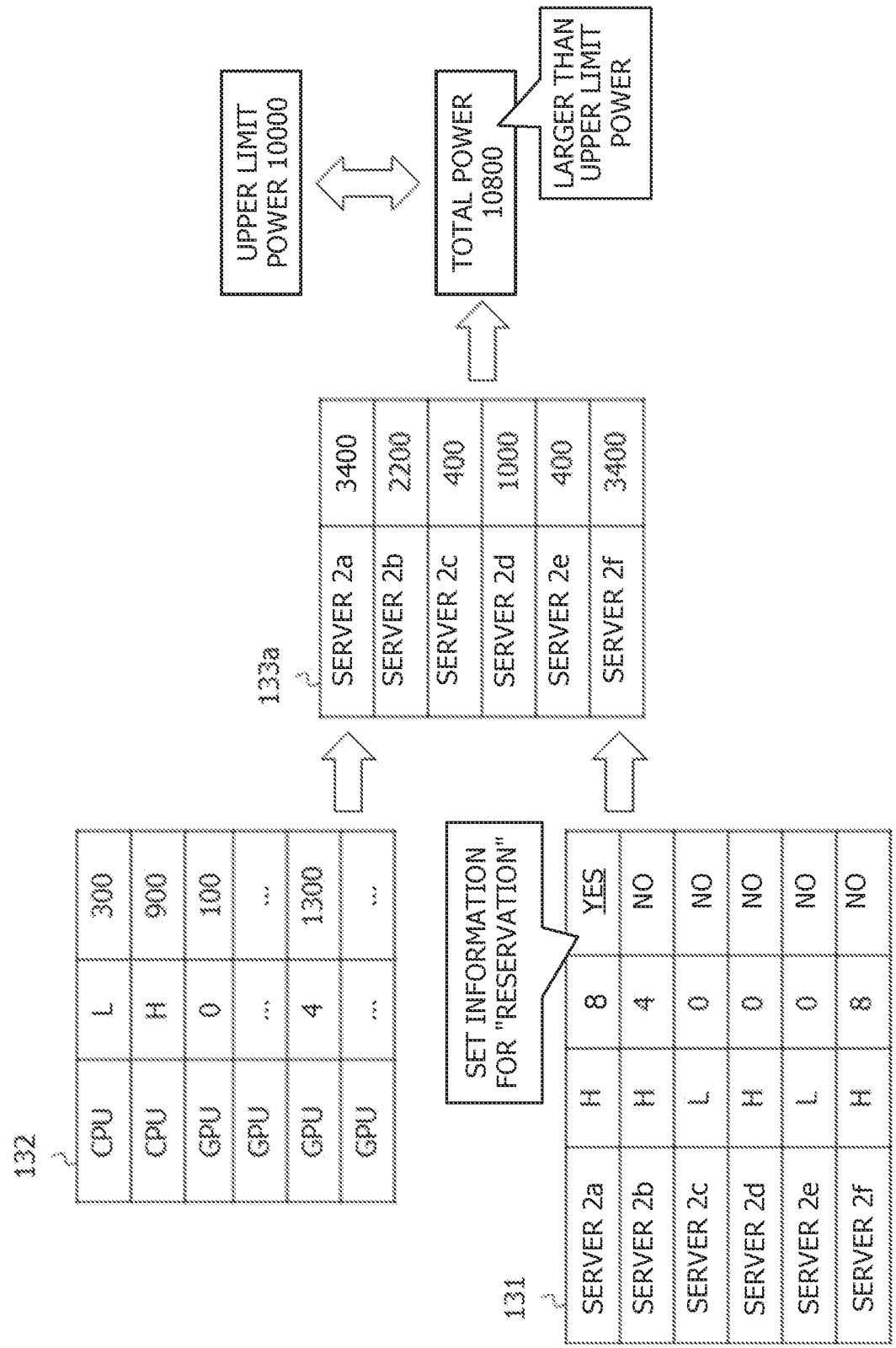
FIG. 20 is a diagram illustrating details of the power management processing according to the first embodiment.

For example, as illustrated in FIG. 20, in a case where the total of power to be consumed by the plurality of servers 2 (first estimated value) is larger than predetermined upper limit value (first upper limit value), the management apparatus 1 waits until the total of power to be consumed by the plurality of servers 2 (first estimated value) is equal to or smaller than the upper limit value (first upper limit value) by setting, in the resource information 131, information indicating that the resource to be used by the specific server 2 is in a reserved state.

For example, the management apparatus 1 according to the present embodiment determines the resource to be used by the specific server 2 in accordance with the details of designation by the user himself/herself who causes the specific server 2 to execute the processing.

Accordingly, for example, even in a case where power to be consumed by each server 2 greatly varies depending on time periods, the management apparatus 1 according to the present embodiment may perform power capping corresponding to a current processing state in each server 2 (for example, power capping that is not contrary to the user's intention). For this reason, the management apparatus 1 may suppress the occurrence of performance deterioration in each server 2. For example, even in a case where high-load processing such as machine learning is performed in each server 2, the management apparatus 1 may suppress the occurrence of performance deterioration in each server 2.

In the processing of S23, the power comparison unit 113 may calculate only the second estimated value corresponding to the server 2 for which the content of the resource information 131 has been changed in the processing of S22. Similarly, in the processing of S34, the power comparison unit 113 may calculate only the second estimated value corresponding to the server 2 for which the content of the resource information 131 has been changed in the processing of S33.

The power setting unit 114 may update only the information corresponding to the second estimated value calculated in the processing of S23, in the capping information 133 stored in the information storage area 130 in the processing of S26. In the processing of S27, the power setting unit 114 may set only the second upper limit value of the server 2 corresponding to the second estimated value calculated in the processing of S23.

Second Embodiment

Next, a second embodiment will be described. FIGS. 21 to 24 are diagrams illustrating the second embodiment.

For example, in power management processing according to the second embodiment, new capping information 133 is generated and setting is performed in each server 2 at timing when a time designated in advance as a time at which a resource used by each server 2 is released (hereinafter also referred to as a release time) is reached, in addition to timing when the execution of processing in each server 2 ends.

Accordingly, the management apparatus 1 according to the second embodiment may perform power capping in which the intention of the user is further reflected. Hereinafter, points that are different from the power management processing according to the first embodiment will be described.

[Functions of Information Processing System]

Figure 21:
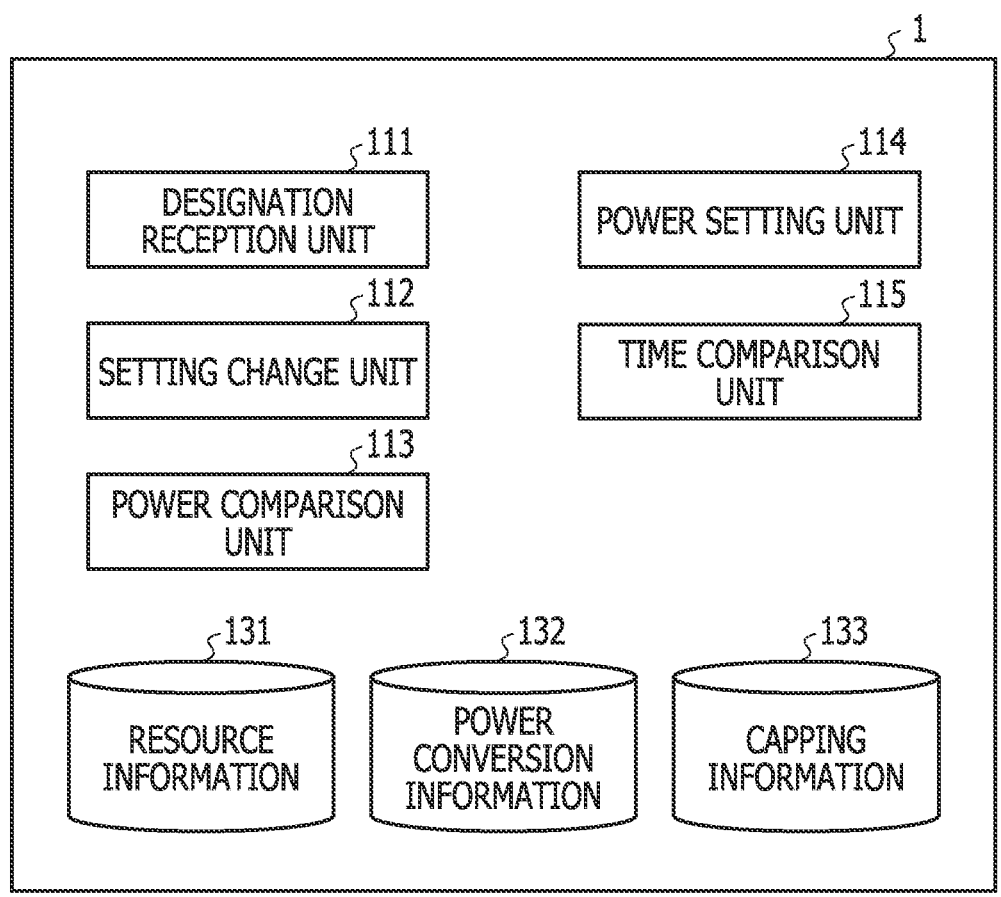
FIG. 21 is a diagram illustrating a functional configuration of the management apparatus according to a second embodiment.

Next, functions of the information processing system 100 according to the second embodiment will be described. FIG. 21 is a diagram illustrating a functional configuration of the management apparatus 1 according to the second embodiment.

For example, as illustrated in FIG. 21, the management apparatus 1 implements various functions including the designation reception unit 111, the setting change unit 112, the power comparison unit 113, the power setting unit 114, and a time comparison unit 115, by the hardware components, such as the CPU 101 and the memory 102, and the program 110 working together organically.

For example, the management apparatus 1 stores the resource information 131, the power conversion information 132, and the capping information 133 in the information storage area 130.

For example, the time comparison unit 115 compares the release time of a resource used by each of the plurality of servers 2 with the current time at predetermined time intervals such as every one minute.

For example, in a case where the time comparison unit 115 determines that there is the server 2 for which the current time has reached the release time (hereinafter also referred to as a release server 2), the setting change unit 112 updates the resource information 131 stored in the information storage area 130. For example, the setting change unit 112 sets, in the resource information 131, information indicating that the resource used by the release server 2 is released.

Subsequently, for example, the power comparison unit 113 refers to the resource information 131 (the resource information 131 changed by the setting change unit 112) and the power conversion information 132 stored in the information storage area 130, and calculates the second estimated value of power to be consumed by the release server 2.

For example, the power comparison unit 113 refers to the resource information 131 (the resource information 131 changed by the setting change unit 112) and the power conversion information 132 stored in the information storage area 130, and updates the information corresponding to the second estimated value of power to be consumed by the release server 2, in the capping information 133 stored in the information storage area 130.

After that, for example, the power setting unit 114 sets, in the release server 2, the second estimated value of power to be consumed by the release server 2 among the second estimated values calculated by the power comparison unit 113, as the second upper limit value of power to be consumed by the release server 2.

[Details of Second Embodiment]

Figure 22:
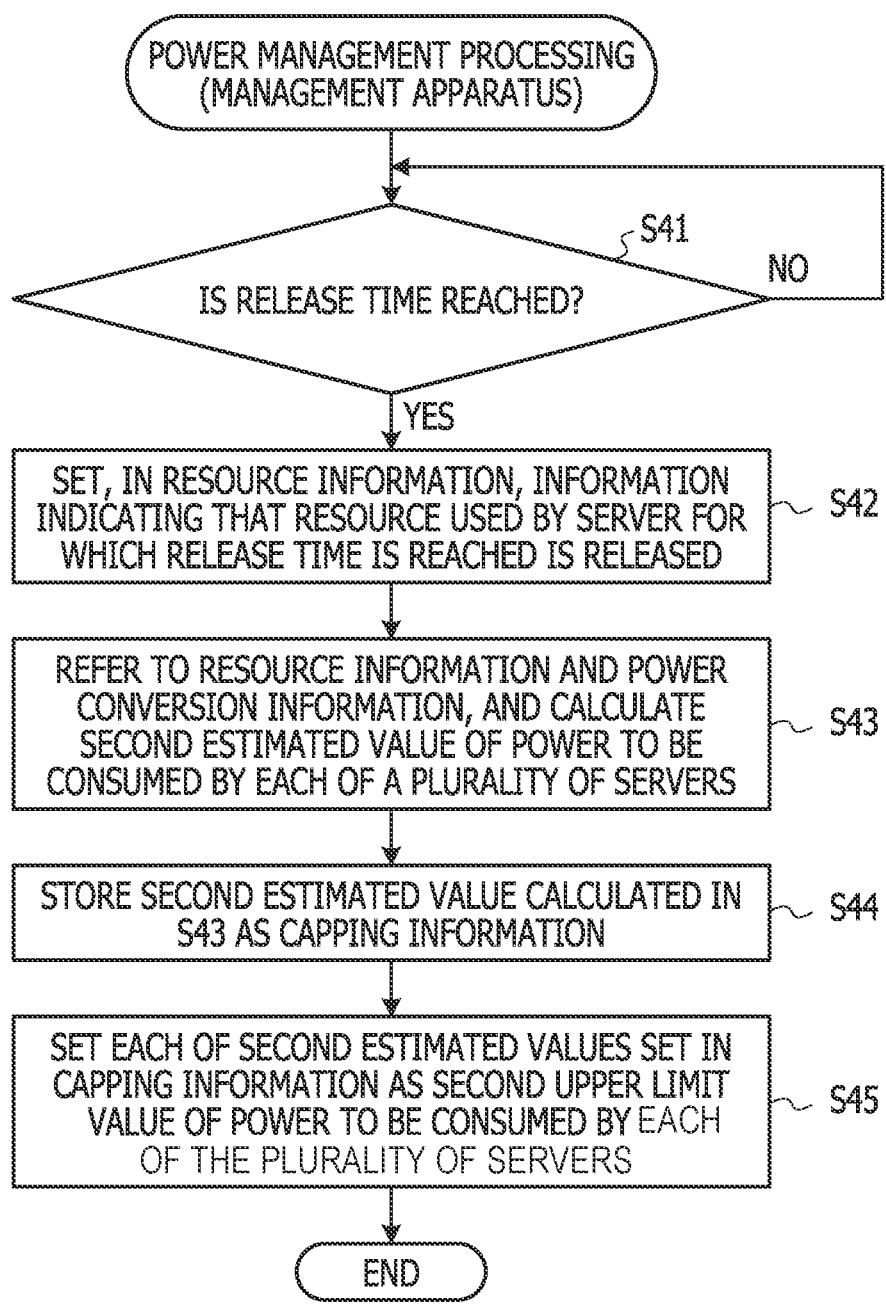
FIG. 22 is a flowchart illustrating details of power management processing according to the second embodiment.

Next, details of the second embodiment will be described. FIG. 22 is a flowchart illustrating details of the power management processing according to the second embodiment. FIGS. 23 and 24 are diagrams illustrating details of the power management processing according to the second embodiment.

For example, as illustrated in FIG. 22, the time comparison unit 115 refers to the resource information 131 stored in the information storage area 130, and waits until the current time reaches any of the release times set in the resource information 131 (NO in S41).

When the current time reaches any of the release times set in the resource information 131 (YES in S41), for example, the setting change unit 112 sets, in the resource information 131, information indicating that the resource used by the release server 2 is released (S42). Hereinafter, specific examples of the resource information 131 according to the second embodiment will be described.

Specific Examples of Resource Information

FIGS. 23 and 24 are diagrams illustrating specific examples of the resource information 131.

The resource information 131 illustrated in FIG. 23 and the like includes, as an item, "time" indicating the release time of a resource used by each server 2, in addition to the items included in the resource information 131 described with reference to FIG. 8 and the like. Hereinafter, the information set for "time" in the resource information 131 illustrated in FIGS. 23 and 24 is also referred to as time information.

For example, in the resource information 131 illustrated in FIG. 23, as the information in the first row, "server 2a" is set for "server name", "L" is set for "CPU", "0" is set for "GPU", "no" is set for "reservation", and "-", indicating that no information is set, is set for "time".

For example, in the resource information 131 illustrated in FIG. 23, as the information in the sixth row, "server 2f" is set for "server name", "H" is set for "CPU", "8" is set for "GPU", "no" is set for "reservation", and "6:00" is set for "time". Description for the remaining information included in FIG. 23 is omitted.

For this reason, for example, in a case where the current time is 6:00, as indicated by the underlined portions in FIG. 24, the setting change unit 112 sets "L" for "CPU" and "0" for "GPU" and also sets "-" for "time", as the information corresponding to "server 2f" (information in the sixth row).

Returning to FIG. 22, for example, the power comparison unit 113 refers to the resource information 131 (the resource information 131 the contents of which have been changed in the processing of S42) and the power conversion information 132 stored in the information storage area 130, and calculates the second estimated value of power to be consumed by each of the plurality of servers 2 (S43).

For example, the power setting unit 114 stores, in the information storage area 130, the second estimated value calculated in the processing of S43 as the capping information 133 (S44).

After that, for example, the power setting unit 114 sets, in each of the plurality of servers 2, each of the second estimated values set in the capping information 133 stored in the information storage area 130, as the second upper limit value of power to be consumed by the relevant server 2 (S45).

Accordingly, the management apparatus 1 according to the second embodiment may perform power capping in which the intention of the user is further reflected.

In the processing of S43, the power comparison unit 113 may calculate only the second estimated value corresponding to the release server 2. The power setting unit 114 may update only the information corresponding to the second estimated value calculated in the processing of S43, in the capping information 133 stored in the information storage area 130 in the processing of S44. In the processing of S45, the power setting unit 114 may set only the second upper limit value of the release server 2.

For example, the management apparatus 1 may generate new capping information 133 and perform setting in each server 2 at timing when power consumed by each server 2 is equal to or lower than a predetermined threshold value, in addition to timing when the execution of processing in each server 2 ends and timing when a release time corresponding to each server 2 is reached.

Third Embodiment

Next, a third embodiment will be described. FIGS. 25 to 28 are diagrams illustrating the third embodiment.

For example, in power management processing according to the third embodiment, in a case where the first resource to be used by the specific server 2 is set as in a reserved state, or in a case where the reserved state for the first resource to be used by the specific server 2 is canceled, the user is notified of such reservation or cancellation.

Accordingly, in the power management processing according to the third embodiment, it is possible to notify the user of information on the state of power supply in the specific server 2.

For example, in the power management processing according to the third embodiment, in a case where the reserved state for the first resource to be used by the specific server 2 is canceled, an instruction of executing a predetermined program in the specific server 2 is given.

Accordingly, in the power management processing according to the third embodiment, it is possible to automatically start execution of a program scheduled to be executed (for example, a program waiting for start of execution) in response to cancellation of the reserved state for the first resource to be used by the specific server 2.

Hereinafter, points that are different from the power management processing according to the first embodiment will be described.

[Functions of Information Processing System]

Figure 25:
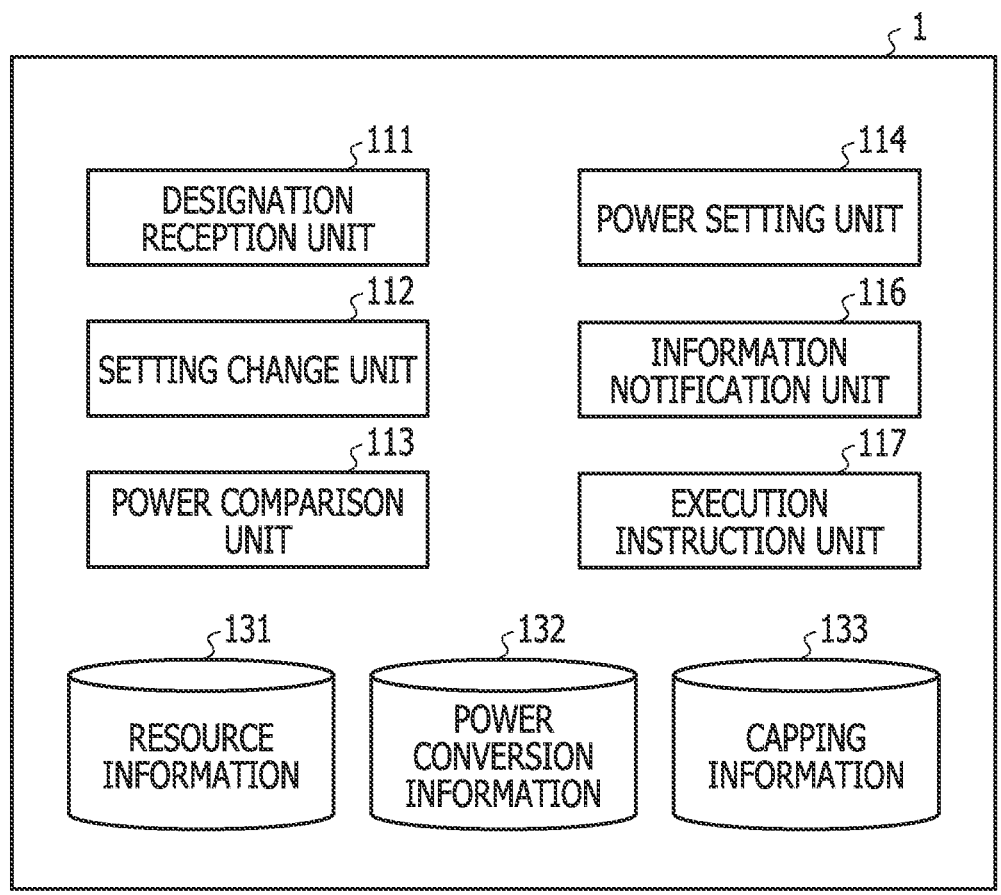
FIG. 25 is a diagram illustrating a functional configuration of the management apparatus according to a third embodiment.

Next, functions of the information processing system 100 according to the third embodiment will be described. FIG. 25 is a diagram illustrating a functional configuration of the management apparatus 1 according to the third embodiment.

For example, as illustrated in FIG. 25, the management apparatus 1 implements various functions including the designation reception unit 111, the setting change unit 112, the power comparison unit 113, the power setting unit 114, an information notification unit 116, and an execution instruction unit 117, by the hardware components, such as the CPU 101 and the memory 102, and the program 110 working together organically.

For example, the management apparatus 1 stores the resource information 131, the power conversion information 132, and the capping information 133 in the information storage area 130.

For example, in a case where the power comparison unit 113 determines that the first estimated value exceeds the first upper limit value, the information notification unit 116 sends, to the user terminal 4, a notification indicating that the first resource to be used by the specific server 2 is set as in a reserved state.

For example, following the end of the execution of processing in the server 2 other than the specific server 2 included in the plurality of servers 2, in a case where the power comparison unit 113 determines that the first estimated value is equal to or smaller than the first upper limit value or in a case where the power setting unit 114 executes the setting processing that has been waited without being executed, the information notification unit 116 sends, to the user terminal 4, a notification indicating that the reserved state for the first resource to be used by the specific server 2 is canceled.

For example, following the end of the execution of processing in the server 2 other than the specific server 2 included in the plurality of servers 2, in a case where the power comparison unit 113 determines that the first estimated value is equal to or smaller than the first upper limit value or in a case where the power setting unit 114 executes the setting processing that has been waited without being executed, the execution instruction unit 117 instructs execution of a program scheduled to be executed (for example, a program designated in advance by the user).

[Details of Third Embodiment]

Figure 26:
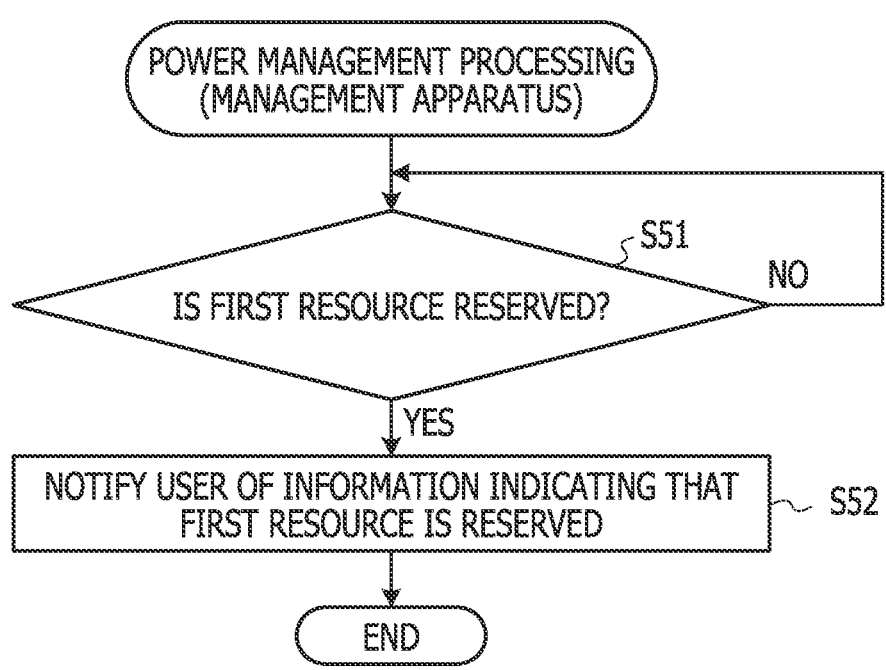
FIG. 26 is a flowchart illustrating details of power management processing according to the third embodiment.
Figure 27:
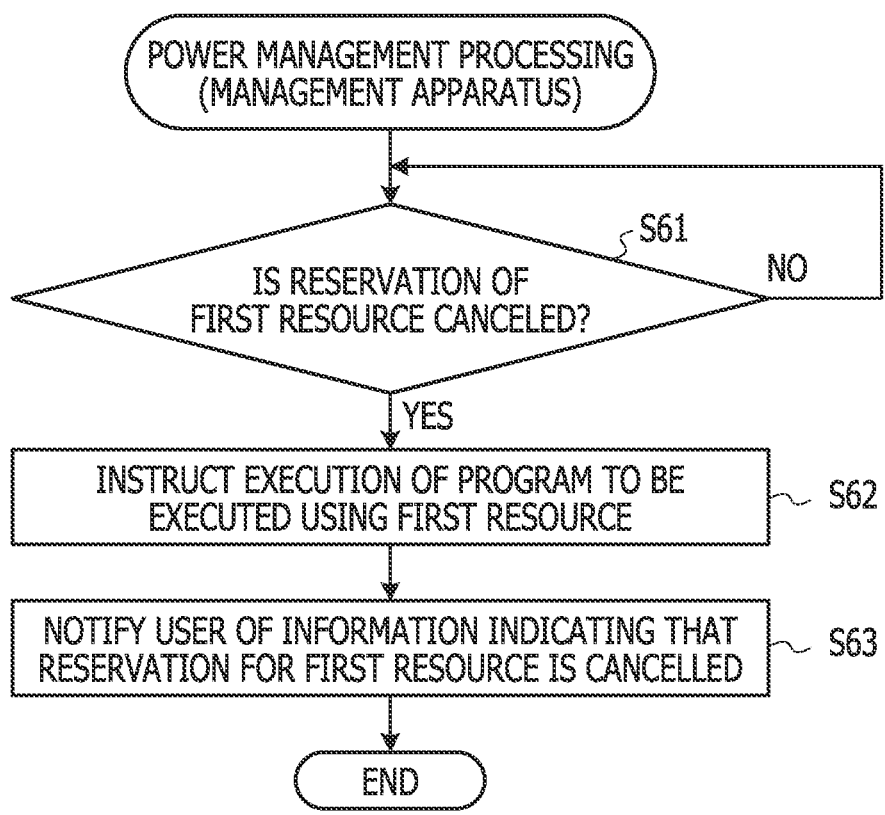
FIG. 27 is a flowchart illustrating details of the power management processing according to the third embodiment.

Next, details of the third embodiment will be described. FIGS. 26 and 27 are flowcharts illustrating details of the power management processing according to the third embodiment. FIG. 28 is a diagram illustrating details of the power management processing according to the third embodiment.

For example, as illustrated in FIG. 26, the information notification unit 116 waits until information indicating that the first resource to be used by the specific server 2 is set as in a reserved state is set in the resource information 131 in the processing of S31 in FIG. 7 (NO in S51).

When the information indicating that the first resource to be used by the specific server 2 is set as in a reserved state is set in the resource information 131 (YES in S51), for example, the information notification unit 116 sends, to the user terminal 4 corresponding to the specific server 2, a notification indicating that the first resource to be used by the specific server 2 is set as in a reserved state (S52). Hereinafter, a specific example of the resource information 131 according to the third embodiment will be described.

Specific Example of Resource Information

FIG. 28 is a diagram illustrating a specific example of the resource information 131.

The resource information 131 illustrated in FIG. 28 includes, as items, "terminal name" indicating the identification information (name) of a terminal that is notified that a resource to be used by the relevant server 2 is set as in a reserved state and "program name" indicating the name of a program to be executed by each server 2 using the resource, in addition to the items included in the resource information 131 described with reference to FIG. 8 and the like.

For example, in the resource information 131 illustrated in FIG. 28, as the information in the first row, "server 2a" is set for "server name", "L" is set for "CPU", "0" is set for "GPU", "no" is set for "reservation", "-" is set for "terminal name", and "-" is set for "program name".

For example, in the resource information 131 illustrated in FIG. 28, as the information in the second row, "server 2b" is set for "server name", "H" is set for "CPU", "4" is set for "GPU", "no" is set for "reservation", "U1" is set for "terminal name", and "P1" is set for "program name". Description for the remaining information included in FIG. 28 is omitted.

For this reason, for example, in a case where the resource to be used by the server 2b is set as in a reserved state, the information notification unit 116 sends, to the user terminal 4 whose "terminal name" is "U1", a notification indicating that the resource to be used by the server 2b is set as in a reserved state.

Accordingly, the management apparatus 1 according to the present embodiment may notify the user of information on the state of power supply in the specific server 2.

Returning to FIG. 27, for example, the execution instruction unit 117 waits until information indicating that the first resource to be used by the specific server 2 is reserved is deleted from the resource information 131 in the processing of S37 in FIG. 7 (NO in S61).

When the information indicating that the first resource to be used by the specific server 2 is reserved is deleted from the resource information 131 (YES in S61), the execution instruction unit 117 gives an instruction of starting execution of a program to be executed by the specific server 2 using the first resource (S62).

For example, in the resource information 131 illustrated in FIG. 28, "P1" is set for "program name" as the information corresponding to "server 2b" (information in the second row). For this reason, for example, in a case where the reserved state for the resource to be used by the server 2b is canceled, the execution instruction unit 117 instructs the server 2b to execute the program whose "program name" is "P1".

Accordingly, the management apparatus 1 according to the present embodiment may automatically start execution of a program scheduled to be executed in response to cancellation of the reserved state for the first resource to be used by the specific server 2.

In this case, the information notification unit 116 sends, to the user terminal 4 corresponding to the specific server 2, a notification indicating that the reserved state for the first resource to be used by the specific server 2 is canceled (S63).

For example, in the resource information 131 illustrated in FIG. 28, "U1" is set for "terminal name" as the information corresponding to "server 2b" (information in the second row). For this reason, for example, in a case where the reserved state for the resource to be used by the server 2*b* is canceled, the information notification unit 116 sends, to the user terminal 4 whose "terminal name" is "U1", a notification indicating that the reserved state for the resource to be used by the server 2*b* is canceled.

Accordingly, the management apparatus 1 according to the present embodiment may notify the user of information on the state of power supply in the specific server 2.

Other Specific Examples of Resource Information and Power Conversion Information Next, other specific examples of the resource information 131 and the power conversion information 132 will be described. FIG. 29 is a diagram illustrating another specific example of the resource information 131. FIG. 30 is a diagram illustrating another specific example of the power conversion information 132.

First, another specific example of the resource information 131 will be described.

The resource information 131 illustrated in FIG. 29 includes, as an item, "memory" in which the memory throughput of the memory 23 of each server 2 is set, in addition to the items included in the resource information 131 described with reference to FIG. 8 and the like. Unlike the resource information 131 described with reference to FIG. 8 and the like, the number of CPUs 21 to be used by each server 2 is set for "CPU" in the resource information 131 illustrated in FIG. 29.

For example, in the resource information 131 illustrated in FIG. 29, as the information in the first row, "server 2*a*" is set for "server name", "8" is set for "CPU", "25 (MB/s)" is set for "memory", "0" is set for "GPU", and "no" is set for "reservation".

For example, in the resource information 131 illustrated in FIG. 29, as the information in the second row, "server 2*b*" is set for "server name", "32" is set for "CPU", "100 (MB/s)" is set for "memory", "4" is set for "GPU", and "no" is set for "reservation". Description for the remaining information included in FIG. 29 is omitted.

Next, another specific example of the power conversion information 132 will be described.

The power conversion information 132 illustrated in FIG. 30 includes the same items as those in the power conversion information 132 described with reference to FIG. 10.

For example, in the power conversion information 132 illustrated in FIG. 30, as the information in the first row, "CPU" is set for "resource name", "8" is set for "setting", and "236 (W)" is set for "power value".

For example, in the power conversion information 132 illustrated in FIG. 30, as the information in the fifth row, "memory" is set for "resource name", "25 (MB/s)" is set for "setting", and "75 (W)" is set for "power value".

For example, in the power conversion information 132 illustrated in FIG. 30, as the information in the 11th row, "GPU" is set for "resource name", "4" is set for "setting", and "1300 (W)" is set for "power value". Description for the remaining information included in FIG. 30 is omitted.

For example, the management apparatus 1 may perform power management processing by using the resource information 131 illustrated in FIG. 29 and the power conversion information 132 illustrated in FIG. 30.

Accordingly, the management apparatus 1 may perform power capping in which the intention of the user is further reflected.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a management program for causing a computer to execute a process, the process comprising:
   receiving designation of a first resource used by a specific server included in a plurality of servers;
   calculating a first estimated value of power to be consumed by the plurality of servers when the specific server executes first processing using the first resource;
   determining whether the first estimated value exceeds a first upper limit value of power to be consumed by the plurality of servers;
   setting in the specific server, when determined that the first estimated value does not exceed the first upper limit value, a second estimated value of power to be consumed by the specific server when the first processing is executed using the first resource, as a second upper limit value of power to be consumed by the specific server;
   waiting, when determined that the first estimated value exceeds the first upper limit value, for the first estimated value to become equal to or smaller than the first upper limit value, without performing the setting; and
   determining whether the first estimated value is equal to or smaller than the first upper limit value in response to an end of execution of processing in any server other than the specific server among the plurality of servers.

2. The non-transitory computer-readable recording medium according to claim 1, wherein
   the plurality of servers are stored in a same rack, and
   the first upper limit value is an upper limit value of power that the same rack is capable to supply to the plurality of servers.

3. The non-transitory computer-readable recording medium according to claim 1, the process further comprising:
   calculating the second estimated value based on power conversion information in which resources used by the plurality of servers and values of power to be consumed when the respective resources are used are associated with each other;
   calculating, based on the power conversion information and resource information that indicates a second resource to be used by each of the plurality of servers, estimated values of power to be consumed by the plurality of servers other than the specific server when the second resource corresponding to each of the plurality of servers other than the specific server is used; and
   calculating a sum of the second estimated value and the calculated estimated values as the first estimated value.

4. The non-transitory computer-readable recording medium according to claim 3, the process further comprising:
acquiring, as the second estimated value, a value of power associated with the first resource from the power conversion information; and
acquiring, as each of the estimated values, a value of power associated with the second resource indicated by the resource information as to be used by each of the plurality of servers other than the specific server, from the power conversion information.

5. The non-transitory computer-readable recording medium according to claim 1, the process further comprising:
updating, among information included in resource information that indicates a second resource to be used by each of the plurality of servers, the second resource corresponding to the specific server to the first resource;
calculating, based on the resource information after the updating is performed and power conversion information in which resources used by the plurality of servers and values of power to be consumed when the respective resources are used are associated with each other, estimated values of power to be consumed by the plurality of servers when the second resource corresponding to each of the plurality of servers is used; and
calculating a sum of the estimated values as the first estimated value.

6. The non-transitory computer-readable recording medium according to claim 1, the process further comprising:
determining, based on time information that indicates a release time at which a resource used by each of the plurality of servers is to be released, whether the release time corresponding to any server among the plurality of servers is reached; and
determining, when the release time corresponding to the any server is reached, whether the first estimated value is equal to or smaller than the first upper limit value on an assumption that execution of processing in the any server has ended.

7. The non-transitory computer-readable recording medium according to claim 1, the process further comprising:
notifying a notification destination corresponding to the specific server of information that indicates waiting of execution of the setting.

8. The non-transitory computer-readable recording medium according to claim 7, the process further comprising:
instructing the specific server to execute a predetermined program to be executed in the specific server, in a case where execution of the setting is performed in response to the first estimated value being equal to or smaller than the first upper limit value.

9. An information processing apparatus, comprising:
a memory; and
a processor coupled to the memory and the processor configured to:
receive designation of a first resource used by a specific server included in a plurality of servers;
calculate a first estimated value of power to be consumed by the plurality of servers when the specific server executes first processing using the first resource;
determine whether the first estimated value exceeds a first upper limit value of power to be consumed by the plurality of servers;
set in the specific server, when determined that the first estimated value does not exceed the first upper limit value, a second estimated value of power to be consumed by the specific server when the first processing is executed using the first resource, as a second upper limit value of power to be consumed by the specific server;
wait, when determined that the first estimated value exceeds the first upper limit value, for the first estimated value to become equal to or smaller than the first upper limit value, without performing the setting; and
determine whether the first estimated value is equal to or smaller than the first upper limit value in response to an end of execution of processing in any server other than the specific server among the plurality of servers.

10. A management method, comprising:
receiving, by a computer, designation of a first resource used by a specific server included in a plurality of servers;
calculating a first estimated value of power to be consumed by the plurality of servers when the specific server executes first processing using the first resource;
determining whether the first estimated value exceeds a first upper limit value of power to be consumed by the plurality of servers;
setting in the specific server, when determined that the first estimated value does not exceed the first upper limit value, a second estimated value of power to be consumed by the specific server when the first processing is executed using the first resource, as a second upper limit value of power to be consumed by the specific server;
waiting, when determined that the first estimated value exceeds the first upper limit value, for the first estimated value to become equal to or smaller than the first upper limit value, without performing the setting; and
determining whether the first estimated value is equal to or smaller than the first upper limit value in response to an end of execution of processing in any server other than the specific server among the plurality of servers.

* * * * *